(12) United States Patent
Sternklar et al.

(10) Patent No.: US 10,641,622 B2
(45) Date of Patent: *May 5, 2020

(54) METHOD AND SYSTEM FOR OPTICAL FIBER SENSING

(71) Applicant: Ariel Scientific Innovations Ltd., Ariel (IL)

(72) Inventors: Shmuel Sternklar, Yakir (IL); David Mermelstein, Gitit (IL)

(73) Assignee: Ariel Scientific Innovations Ltd., Ariel (IL)

(*) Notice: Subject to any disclaimer, the term of this patent is extended or adjusted under 35 U.S.C. 154(b) by 0 days.

This patent is subject to a terminal disclaimer.

(21) Appl. No.: 16/392,692

(22) Filed: Apr. 24, 2019

(65) Prior Publication Data

US 2019/0250015 A1    Aug. 15, 2019

Related U.S. Application Data

(63) Continuation of application No. 15/319,001, filed as application No. PCT/IL2015/050609 on Jun. 16, 2015, now Pat. No. 10,302,467.

(Continued)

(51) Int. Cl.
*G01D 5/353* (2006.01)
*G01M 11/00* (2006.01)
*G01D 5/36* (2006.01)
*H01S 3/067* (2006.01)
*H01S 3/30* (2006.01)

(52) U.S. Cl.
CPC ..... *G01D 5/35377* (2013.01); *G01D 5/35361* (2013.01); *G01D 5/36* (2013.01); *G01M 11/319* (2013.01); *G01M 11/3109* (2013.01); *H01S 3/06754* (2013.01); *H01S 3/302* (2013.01)

(58) Field of Classification Search
CPC .................. G01D 5/35358; G01D 5/35361
See application file for complete search history.

(56) References Cited

U.S. PATENT DOCUMENTS 5,291,267 A     3/1994  Sorin et al.
10,302,467 B2 * 5/2019  Sternklar ........... G01M 11/3109
(Continued)

FOREIGN PATENT DOCUMENTS

EP    0348235    12/1989
JP    63-131043   6/1988
(Continued)

OTHER PUBLICATIONS

International Preliminary Report on Patentability dated Dec. 29, 2016 From the International Bureau of WIPO Re. Application No. PCT/IL2015/050609. (7 Pages).

(Continued)

*Primary Examiner* — Thanh Luu

(57) ABSTRACT

A method of optical sensing is disclosed. The method comprises coupling an excitation optical signal into a first optical fiber to induce Rayleigh backscattering, thereby providing a backscattered signal; coupling the backscattered signal into a second optical fiber, spatially separated from the first optical fiber; and optically amplifying the backscattered signal in the second optical fiber, thereby generating a sensing signal.

17 Claims, 13 Drawing Sheets
(7 of 13 Drawing Sheet(s) Filed in Color)

Related U.S. Application Data

(60) Provisional application No. 62/012,429, filed on Jun. 16, 2014.

(56) References Cited

U.S. PATENT DOCUMENTS

| | | |
|---|---|---|
| 2007/0171401 A1 | 7/2007 | Ukita |
| 2009/0263069 A1 | 10/2009 | Hartog |
| 2011/0199607 A1 | 8/2011 | Kanellopoulos et al. |
| 2017/0115138 A1 | 4/2017 | Sternklar et al. |

FOREIGN PATENT DOCUMENTS

| | | |
|---|---|---|
| WO | WO 2009/148824 | 12/2009 |
| WO | WO 2015/193891 | 12/2015 |

OTHER PUBLICATIONS

International Search Report and the Written Opinion dated Sep. 21, 2015 From the International Searching Authority Re. Application No. PCT/IL2015/050609.
Official Action dated May 29, 2018 From the U.S. Patent and Trademark Office Re. U.S. Appl. No. 15/319,001. 11 pages).
Agrawal "Nonlinear Fiber Optics: Optics and Photonics", Nonlinear Fiber Optics, Academic Press, 3rd Edition, p. I-XVI, 1-466, 2013.
Beugnot et al. "Distributed Brillouin Sensing With Sub-Meter Spatial Resolution: Modeling and Processing", Optics Express, 9(8): 7381-7397, Apr. 1, 2011.
Bloch et al. "Wavelength Monitoring With Mutually Modulated Cross-Gain Modulation in a Semiconductor Optical Amplifier and Brillouin Amplifier", Journal of the Optical Society of America B, 30(4): 974-977, Mar. 21, 2013.
Cui et al. "Distributed Temperature Sensing System Based on Rayleigh Scattering BOTDA", IEEE Sensors Journal, 11(2): 399-403, Sep. 23, 2010.
Dong et al. "Sub-MHz Ultrahigh-Resolution Optical Spectrometry Based on Brillouin Dynamic Gratings", Optics Letters, 39(10): 2967-2970, May 12, 2014.
Fotiadi et al. "Cooperative Stimulated Brillouin and Rayleigh Backscattering Process in Optical Fiber", Optics Letters, 23(23): 1805-1807, Dec. 1, 1998.
Galindez-Jamioy et al. "Brillouin Distributed Fiber Sensors: An Overview and Applications", Journal of Sensors, 2012(Art.ID 204121): 1-17, 2012.
Koyamada et al. "Fiber-Optic Distributed Strain and Temperature Sensing With Very High Measurand Resolution Over Long Range Using Coherent OTDR", Journal of Lightwave Technology, 27(9): 1142-1146, Apr. 24, 2009.
Loayssa et al. "Applications of Optical Carrier Brillouin Processing to Microwave Photonics", Optical Fiber Technology, 8(1): 24-42, Jan. 2002.
Minardo et al. "Distributed Temperature Sensing in Polymer Optical Fiber by Bofda", IEEE Photonics Technology Letters, 26(4): 387-390, Feb. 15, 2014.
Pant et al. "On-Chip Stimulated Brillouin Scattering for Microwave Signal Processing and Generation", Laser and Photonics Reviews, 8(5): 653-666, 2014.
Zhang et al. "A Hybrid Single-End-Access BOTDA and COTDR Sensing System Using Heterodyne Detection", Journal of Lightwave Technology, 31(12): 1954-1959, May 13, 2013.
Zhao et al. "On-Line Monitoring System of 110kV Submarine Cable Based on BOTDR", Sensors and Actuators A: Physical, 216: 28-35, Available Online May 9, 2014.

\* cited by examiner

FIG. 1A
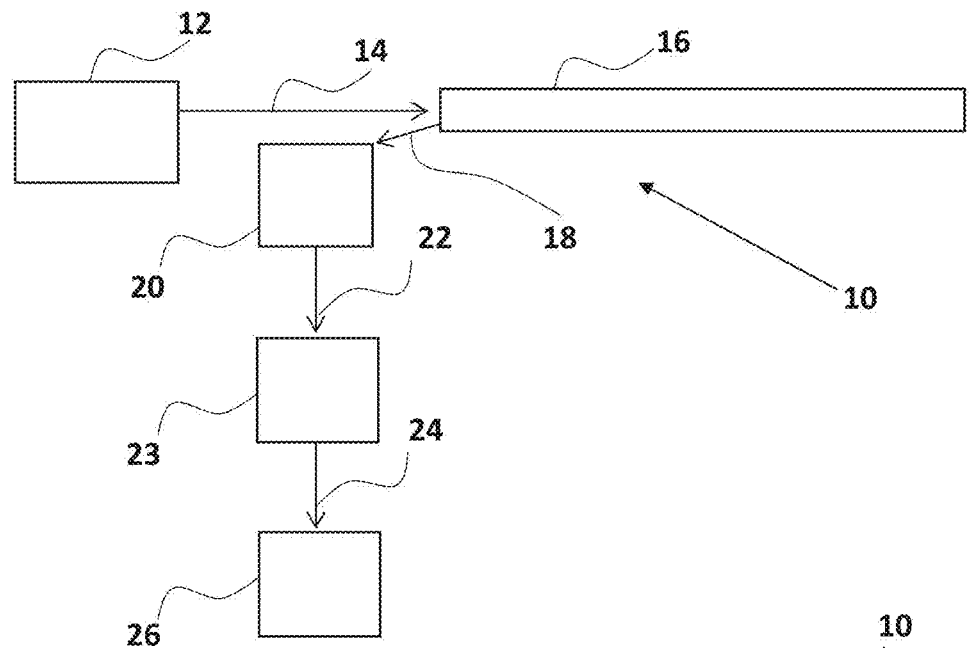
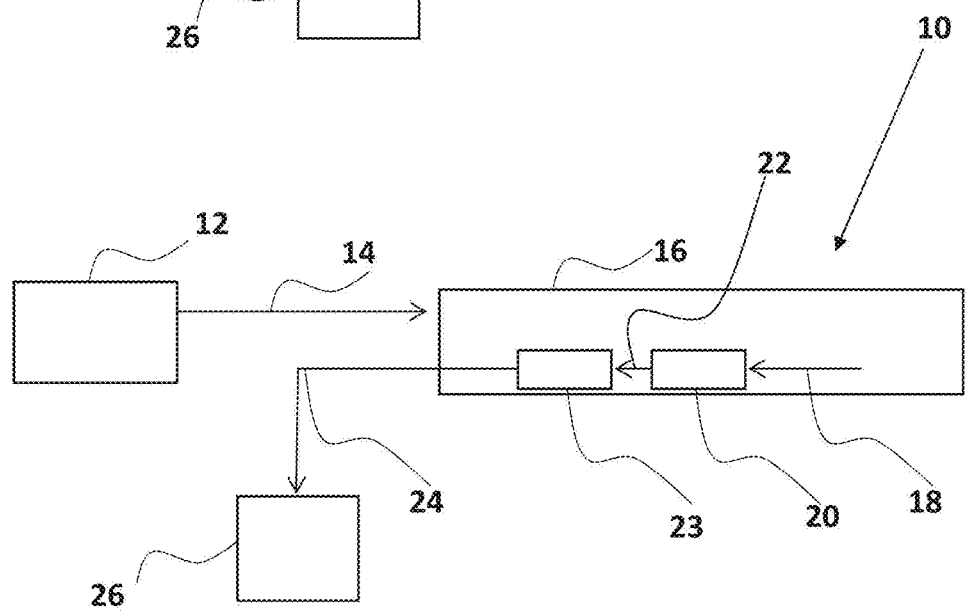
FIG. 1B

METHOD AND SYSTEM FOR OPTICAL FIBER SENSING

RELATED APPLICATION

This application is continuation of U.S. patent application Ser. No. 15/319,001 filed on Dec. 15, 2016 which is a National Phase of PCT Patent Application No. PCT/IL2015/050609 having International Filing Date of Jun. 16, 2015, which claims the benefit of priority under 35 USC § 119(e) of U.S. Provisional Patent Application No. 62/012,429 filed on Jun. 16, 2014. The contents of the above applications are all incorporated by reference as if fully set forth herein in their entirety.

FIELD AND BACKGROUND OF THE INVENTION

The present invention, in some embodiments thereof, relates to optical fiber sensing and, more particularly, but not exclusively, to a method and system for sensing properties along an optical fiber.

It is often desirable to monitor strain in a structure, such as a bridge or highway overpass, a building, or a component in a vehicle, in order to get advance warning of fracture or other failure of the structure. However, it is not always convenient (or even necessary) to monitor the strain as it is occurring, and it is sufficient to know merely the maximum strain the structure has experienced in a given timeframe. For example, for vehicles such as aircraft, weight, space and other limitations would preclude monitoring strain of components therein in real time, but for purposes of evaluating the likelihood of future failure, it would be sufficient to know the maximum strain the component in the vehicle experienced during a particular trip. Therefore, it would be convenient to have a means of sensing and maintaining for later measurement the maximum strain the component experienced.

Optical fiber sensors for measuring strain are known in the art, and have many advantages over other types of sensors. They are economical, durable, light-weight, and can be used in electromagnetically noisy environments, and are therefore ideal for use in aircraft. Heretofore, Rayleigh scattering has been used for monitoring the mechanical properties along the fiber in configuration known as optical time-domain reflectometry (OTDR) and its' various implementations [Koyamada, et al., Lightwave Tech. 27, 1142 (2009); Pan et al., in Optical Fiber Communication Conference, OSA Technical Digest (online) (Optical Society of America, 2014), paper Th2A.21; A. Champavere, in Optical Fiber Communication Conference, OSA Technical Digest (online) (Optical Society of America, 2014), paper W3D.1].

Another type of OTDR is known as Brillouin OTDR technique, which involves measurements based on Brillouin scattering. In an optical fiber, Brillouin scattering is an inelastic phenomenon that results from the interaction of incident optical photons (of an incident optical signal) with acoustic phonons in the medium (the optical fiber). This interaction induces a counter-propagating optical wave (reflected or backscattered optical signal) having a frequency (known as the Brillouin frequency) that is shifted from the frequency of the original incident optical wave. Brillouin scattering in an optical fiber is sensitive to both temperature and strain changes in the optical fiber.

European Publication No. EP0348235 discloses a method for evaluating properties of an optical fiber using Brillouin amplification. The technique uses a non-linear interaction between a first modulated signal light from a first light source and a second signal light from a second light source which counter propagate in an optical fiber, and analyzes the signal waveform of the second signal light which is influenced by Brillouin light amplification.

Additional background art includes Beugnot et al., "Distributed Brillouin sensing with submeter spatial resolution: modeling and processing", Optics Express, 19, 7381 (2011); Zhao et al., "On-line monitoring system of 110 kV submarine cable based on BOTDR", Sensors and Actuators A: Physical, 216, 28 (2014); and Minardo et al., "High-Spatial Resolution DPP-BOTDA by Real-Time Balanced Detection", IEEE Photonics Technology Letters, 26, 1251 (2014).

SUMMARY OF THE INVENTION

According to some embodiments of the invention the present invention there is provided a method of optical sensing. The method comprises: coupling an excitation optical signal into a first optical fiber to induce Rayleigh backscattering, thereby providing a backscattered signal; coupling the backscattered signal into a second optical fiber, spatially separated from the first optical fiber; and optically amplifying the backscattered signal in the second optical fiber, thereby generating a sensing signal.

According to some embodiments of the invention the optically amplifying comprises introducing a pump light beam into the second fiber, wherein the pump light beam and the backscattered signal enter the second fiber from opposite ends thereof.

According to some embodiments of the invention the optically amplifying comprises introducing a pump light beam into the second fiber, wherein the pump light beam and the backscattered signal enter the second fiber from the same end thereof.

According to an aspect of some embodiments of the present invention there is provided a method of optical sensing. The method comprises: coupling an excitation optical signal into an optical fiber to induce Rayleigh backscattering, thereby providing a backscattered signal; optically amplifying the backscattered signal in the optical fiber, thereby generating a sensing signal; wherein the optically amplifying is by pump light beam at intensity I satisfying $gI \geq K+2\alpha$, $\alpha$ being a Rayleigh scattering coefficient characteristic to the fiber, g being a gain coefficient characteristic to the fiber, and K being a predetermined variation rate which larger than $-0.01$ $m^{-1}$.

According to some embodiments of the invention the method comprises transmitting the sensing signal into a signal analyzer, for analyzing the sensing signal so as to identify a change in at least one property along the first fiber.

According to some embodiments of the invention the method comprises transmitting the sensing signal into a signal analyzer, for analyzing the sensing signal so as to identify a spatially-resolved change in at least one property along the first fiber.

According to some embodiments of the invention the optically amplifying comprises employing Brillouin amplification.

According to some embodiments of the invention the optically amplifying comprises employing Raman amplification.

According to some embodiments of the invention the optical amplification is an on-resonance optical amplification.

According to some embodiments of the invention the optical amplification is an off-resonance optical amplification.

According to an aspect of some embodiments of the present invention there is provided a system for optical sensing. The system comprises: a light source system configured for generating an excitation optical signal selected to induce Rayleigh backscattering, and a pump light beam selected to amplify the Rayleigh backscattering; an arrangement of optical couplers arranged for coupling the excitation optical signal into a first optical fiber thereby providing a backscattered signal, and for coupling the backscattered signal and the pump light beam into a second optical fiber, spatially separated from the first optical fiber, to thereby generate an optically amplified sensing signal; and a signal analyzer, for analyzing the sensing signal so as to identify a change in at least one property along the first fiber.

According to some embodiments of the invention the pump light beam and the backscattered signal enter the second fiber from opposite ends thereof.

According to some embodiments of the invention the pump light beam and the backscattered signal enter the second fiber from the same end thereof.

According to an aspect of some embodiments of the present invention there is provided a system of optical sensing. The system comprises: a light source system configured for generating an excitation optical signal selected to induce Rayleigh backscattering, and a pump light beam selected to amplify the Rayleigh backscattering; an optical coupler arranged for coupling the excitation optical signal and the pump light beam into an optical fiber to thereby generate an optically amplified sensing signal; and a signal analyzer, for analyzing the sensing signal so as to identify a change in at least one property along the fiber; wherein the pump light beam has intensity I satisfying $gI \geq K+2\alpha$.

According to some embodiments of the invention K is larger than $-0.001 \text{ m}^{-1}$. According to some embodiments of the invention K is larger than $-0.0001 \text{ m}^{-1}$.

According to some embodiments of the invention the intensity I satisfies $gI \geq 2\alpha$. According to some embodiments of the invention the intensity I satisfies $gI \geq 2\alpha$.

According to some embodiments of the invention the signal analyzer is configured for analyzing the sensing signal so as to allow identifying a spatially-resolved change in at least one property along the first fiber.

According to some embodiments of the invention the at least one property is a mechanical property.

According to some embodiments of the invention the mechanical property comprises strain. According to some embodiments of the invention the mechanical property comprises pressure. According to some embodiments of the invention the mechanical property comprises vibration. According to some embodiments of the invention the vibration comprises acoustic vibration.

According to some embodiments of the invention the at least one property is a thermal property.

According to some embodiments of the invention the at least one property is a chemical property.

According to some embodiments of the invention the pump light beam is selected to amplify the Rayleigh backscattering by Raman amplification.

According to some embodiments of the invention the pump light beam is selected to amplify the Rayleigh backscattering by Brillouin amplification.

According to some embodiments of the invention the excitation optical signal is a pulsed optical signal.

According to some embodiments of the invention a characteristic duty cycle of the pulsed optical signal is less than 10%.

According to some embodiments of the invention the pump light beam is selected to induce an on-resonance optical amplification.

According to some embodiments of the invention the pump light beam is selected to induce an off-resonance optical amplification.

According to some embodiments of the invention a detuning frequency of the off-resonance optical amplification is from about 0.1X to about 0.9X, where X is a characteristic on-resonance bandwidth of the optical amplification.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

The patent or application file contains at least one drawing executed in color. Copies of this patent or patent application publication with color drawing(s) will be provided by the Office upon request and payment of the necessary fee.

In the drawings:

FIGS. 1A and 1B are schematic illustrations of a device for detecting interference with an object based on detecting a change in optical properties of the object according to embodiments of the teachings herein;

Figure 10:
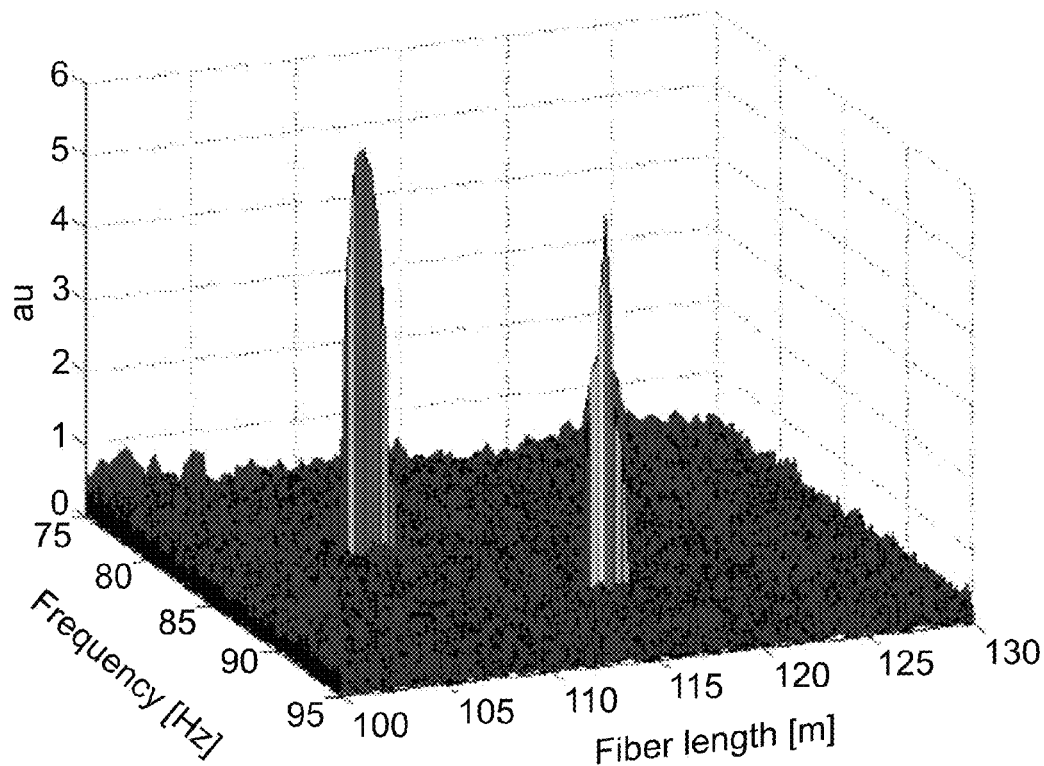
Figure 11A:
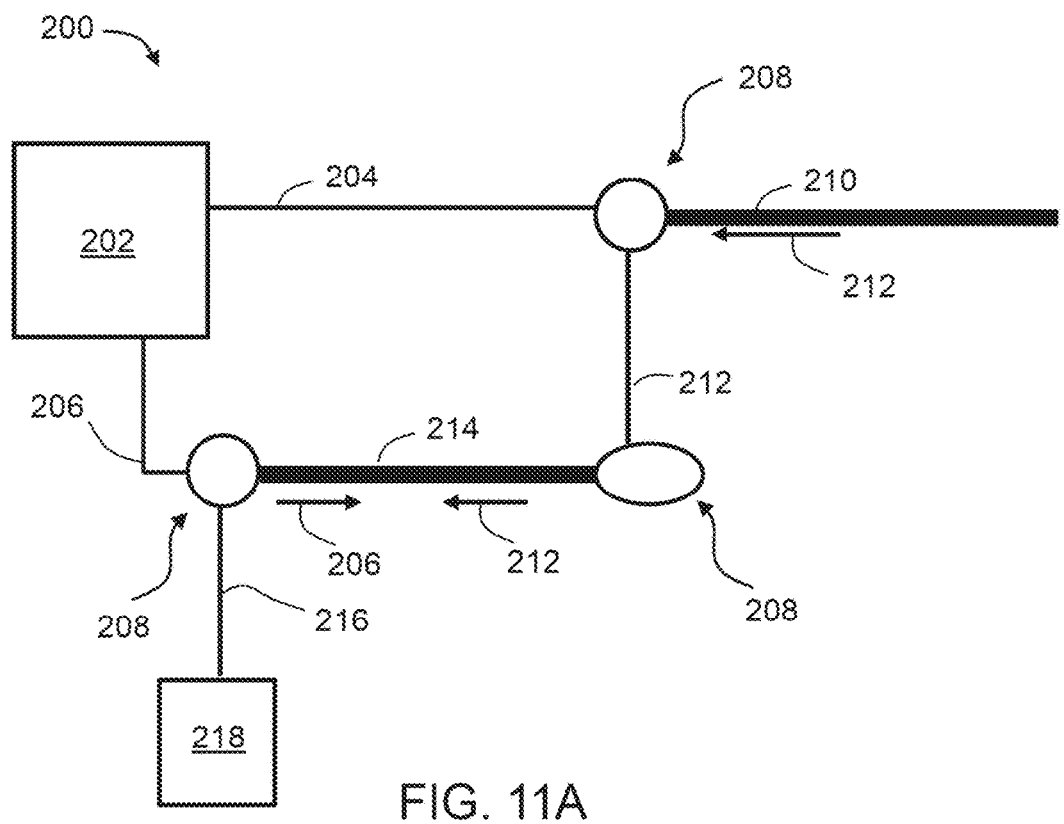
Figure 11B:
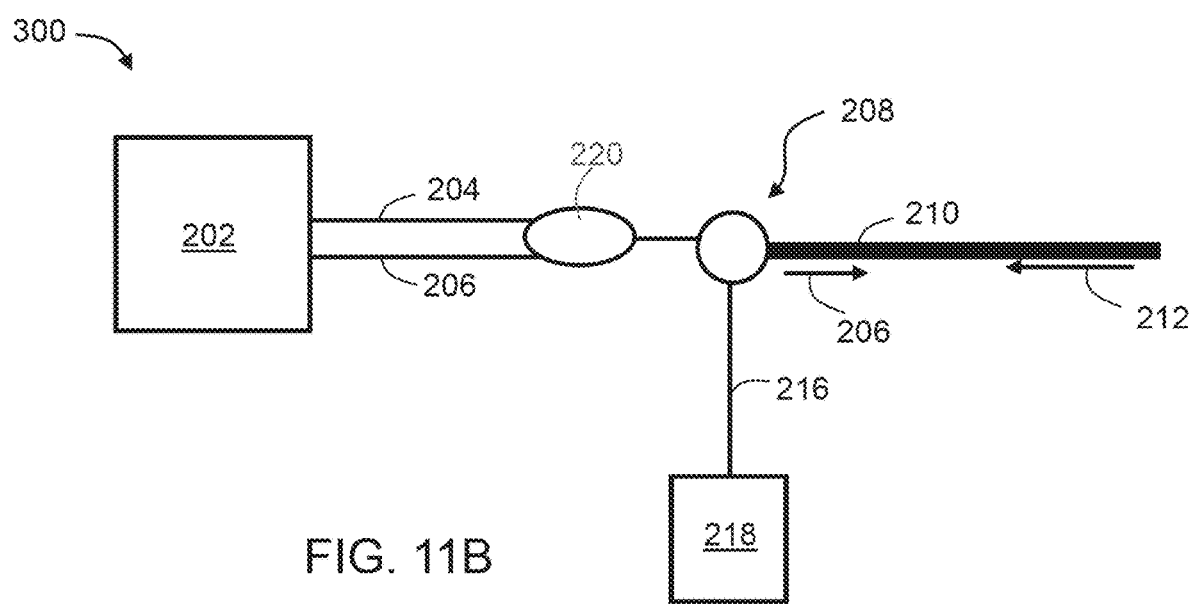
Figure 11C:
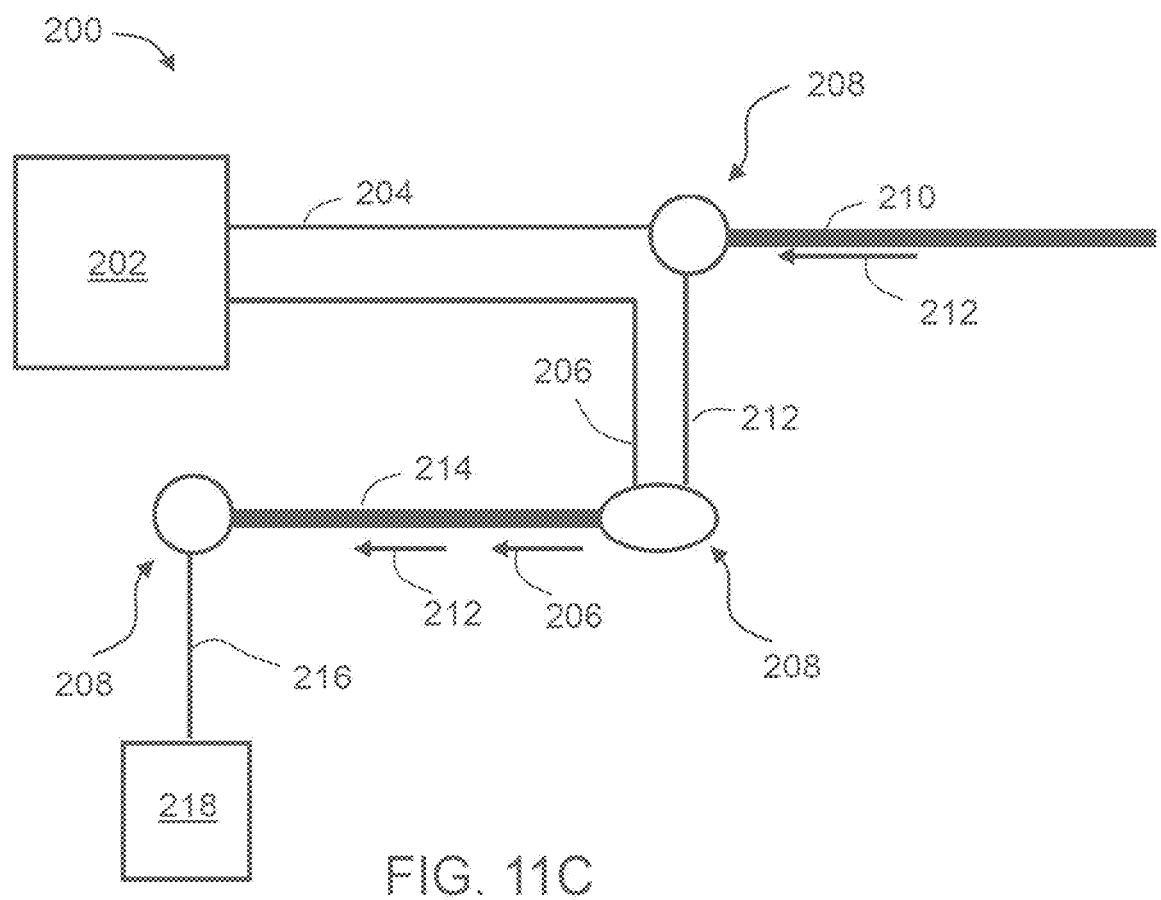

FIG. 10 show results of experiments performed according to some embodiments of the present invention wherein vibrations were applied at two separated locations along an optical fiber; and FIGS. 11A-11C are schematic illustrations of a system for optical sensing, in embodiments of the invention in which optical amplification is executed in a separate fiber where Rayleigh backscattering backscattered signal and a pump light beam enter the fiber from opposite ends (FIG. 11A), in embodiments of the invention in which optical amplification is executed in a separate fiber where the Rayleigh backscattering backscattered signal and the pump light beam enter the fiber from the same end (FIG. 11C), and in embodiments in which optical amplification is executed in the same fiber in which Rayleigh backscattering occurs (FIG. 11B).

DESCRIPTION OF SPECIFIC EMBODIMENTS OF THE INVENTION

The present invention, in some embodiments thereof, relates to optical fiber sensing and, more particularly, but not exclusively, to a method and system for sensing properties along an optical fiber.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Light propagating in a medium can undergo a variety of scattering events, both linear and non-linear. Three types of light scattering include Rayleigh scattering, Raman scattering and Brillouin scattering. In Rayleigh scattering, incident light is elastically scattered at the same wavelength. In Raman scattering, incident light is scattered by the vibrations of molecules or optical phonons and undergoes relatively large frequency shifts. In Brillouin scattering, incident light is scattered by acoustic vibrations (phonons) and undergoes relatively small frequency shifts.

Rayleigh, Raman, and Brillouin scatterings can be used in distributed optical waveguide sensors to measure a physical parameter such as temperature, strain, stress and pressure over the length of an optical fiber. Light is propagated in the optical fiber. Light scattering occurs within the waveguide, part of which is captured in the backward propagating modes of the waveguide and can be detected by a receiver. By monitoring one or more variations in the captured light the physical parameter can be determined.

It was realized by the present Inventors that traditional fiber optic sensors based on scattering have problems because scattering produces signals that are much weaker than the light that created them. The originating light produces a relatively small amount of scattered light, only a portion of which is captured.

While conceiving the present invention it has been hypothesized and while reducing the present invention to practice it has been realized that Rayleigh backscattered light can be amplified by optical amplification. The present Inventors found and experimentally proved that optical amplification can significantly flatten, or fully flatten or reverse the exponential decay of backscattered light. The present Inventors also found and experimentally proved that the signal-to-noise ratio (SNR) can be significantly enhanced by judicious selection of the parameters of the optical amplification. The present Inventors have therefore devised a method and a system for optical sensing that utilize these discoveries.

The optical sensing of the present embodiments can be utilized to monitor strain in a structure, such as a bridge or highway overpass, a building, or a component in a vehicle, in order to get advance warning of fracture or other failure of the structure. In these embodiments, an optical fiber is placed along the structure and the technique of the present embodiments is employed to obtain a sensing signal and to determine the strain or changes in the strain based on the obtained sensing signal.

The optical sensing of the present embodiments can be utilized sensing of a wellbore, pipeline, or other conduit or tube so as to measure properties and conditions thereof. In these embodiments, an optical fiber is placed in the wellbore, pipeline, or other conduit or tube and the technique of the present embodiments is employed to obtain a sensing signal and to determine one or more properties. For example, formation properties that may be measured in downhole reservoirs comprise pressure, temperature, porosity, permeability, density, mineral content, electrical conductivity, and bed thickness. Fluid properties, such as pressure, temperature, density, viscosity, chemical elements, and the content of oil, water, and/or gas, may also be measured. In addition, downhole-logging tools based on sonic well logging systems may be used to measure downhole properties such as formation porosity, location of bed boundaries and fluid interfaces, well casing condition, and behind casing cement location and bonding quality-monitoring properties and conditions over time.

The optical sensing of the present embodiments can be utilized for sensing intrusion or sabotage detection. In these embodiments, an optical fiber is placed along a perimeter fence, or underground, or underwater, or along a pipeline or any other facility or structure and the technique of the present embodiments is employed to obtain a sensing signal, to determine whether there is an intrusion or a sabotage, and to alert responsively to such detection.

Figure 2:
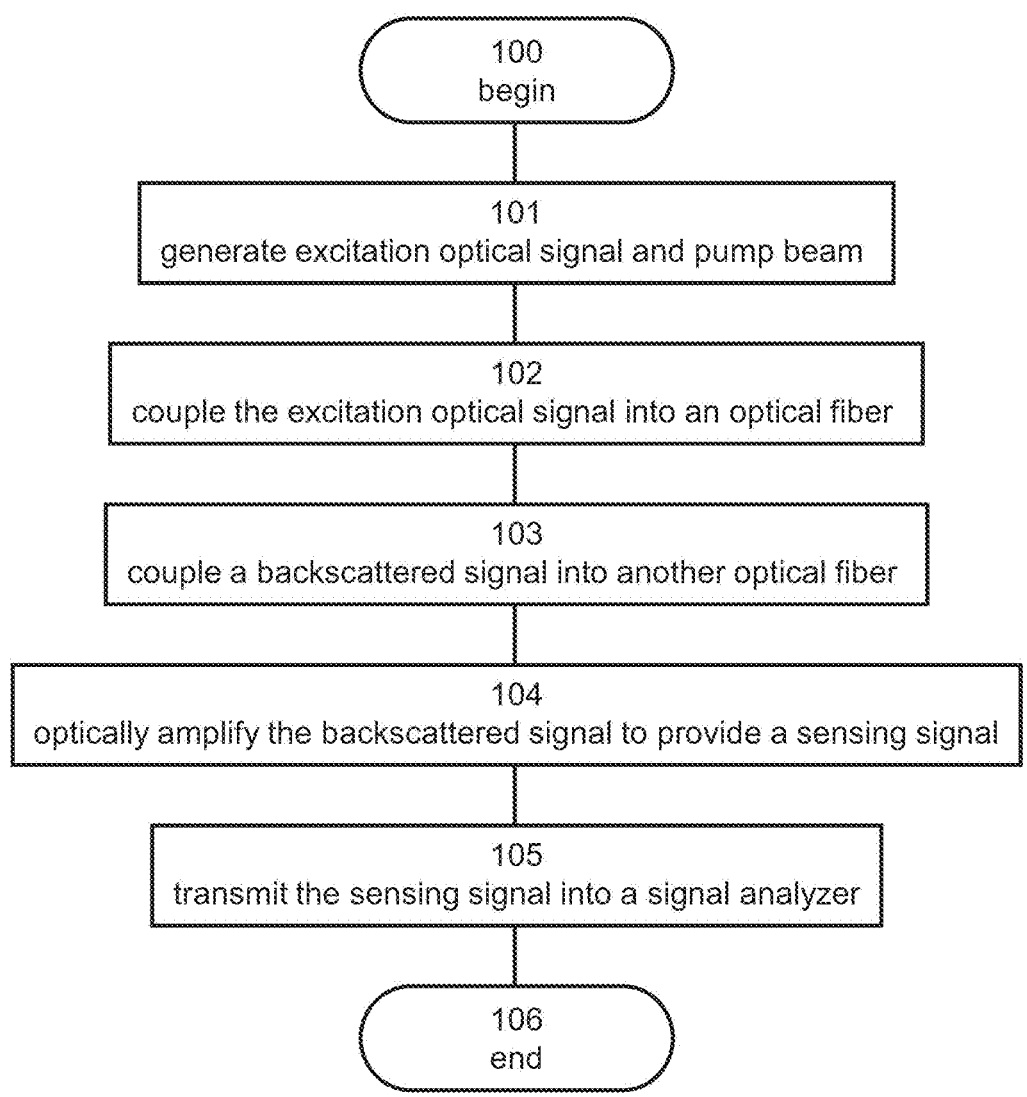
FIG. 2 is a flowchart diagram describing a method of optical sensing, according to some embodiments of the present invention.

FIG. 2 is a flowchart diagram of the method according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 100 and optionally and preferably continues to 101 at which light is generated, preferably by a light source system, such as, but not limited to, a laser light source system. The generated light optionally and preferably includes an excitation optical signal and a pump light beam. The central frequency of the spectrum of the excitation optical signal is denoted $f_e$, and the central frequency of the spectrum of the pump light beam is denoted $f_p$. The difference between $f_e$ and $f_p$, in absolute value, is denoted $\Delta f$.

The excitation optical signal can be at a frequency which is at a value that is exactly at, or close to (e.g., within several MHz from) the characteristic resonant Stokes frequency shift from the pump beam frequency. The characteristic resonant Stokes frequency shift of an optical fiber can be determined, for example, by prior measurement. In some embodiments of the present invention the excitation optical signal is a pulsed optical signal. The duty cycle and pulse width of the pulses in the pulsed optical signal can be selected to reduce or prevent aliasing level and in accordance with the desired spatial accuracy of the optical sensing. The characteristic duty cycle of pulsed optical signal is preferably small, e.g., less than 10% or less than 5% or less than 2% or less than 1% or less than 0.5% or less than 0.2%, e.g., 0.1% or less. The characteristic pulse width of the pulsed optical signal can be from about 0.1 ns to about 100 ns or from about 1 ns to about 100 ns or from about 10 ns to about 100 ns or from about 10 ns to about 50 ns, e.g., about 20 ns.

The pump light beam can be a CW beam. The central wavelength of the pump light beam can be selected to effect on-resonance optical amplification or an off-resonance optical amplification of the Stokes beam. Preferably, the optical amplification comprises Brillouin amplification. Alternatively, the optical amplification comprises Raman amplification. In both cases, either the frequency $f_p$ of the pump light beam is selected based on $f_e$ or, equivalently, the frequency $f_e$ is selected based on $f_p$.

In some embodiments of the present invention the difference between $f_e$ and $f_p$ is the same or about the characteristic resonant Stokes frequency shift of the optical fiber, and is also based on the physical mechanism according to which optical amplification is employed.

The difference between the actual frequency shift $\Delta f$ and the resonant frequency shift value of the optical fiber for the amplification mechanism that is being activated (e.g., Brillouin scattering, Raman scattering), in absolute value, is referred to as a detuning frequency.

When an on-resonance optical amplification is employed, the detuning frequency is zero or close to zero (e.g., less that 0.1X or less than 0.05X or less than 0.01X, where X is the characteristic on-resonance bandwidth of the optical amplification).

When an off-resonance optical amplification is employed, the detuning frequency is optionally and preferably from about 0.1X to about 0.9X, where X is a characteristic on-resonance bandwidth of the optical amplification.

Preferably, the detuning frequency is less than 100 MHz, more preferably less than 80 MHz, more preferably less than 60 MHz, more preferably from about 3 MHz to about 60 MHz, or from about 3 MHz to about 50 MHz, or from about 3 MHz to about 40 MHz, or from about 3 MHz to about 30 MHz, or from about 3 MHz to about 20 MHz, or from about 3 MHz to about 15 MHz. These embodiments are particularly useful for Brillouin amplification. For Raman amplification the detuning frequency can be larger, for example, from about 1000 to about 10,000 larger than the aforementioned detuning frequencies.

In various exemplary embodiments of the invention both the excitation optical signal and the pump light beam are formed from the same light beam. While such configuration is preferred, embodiments in which the excitation optical signal and the pump light beam are formed by two separate light sources are also contemplated. Use of a single light source is particularly useful for Brillouin amplification, and use of two separate light sources is particularly useful for the Raman amplification.

For example, a CW light beam can be generated and split into two beams. One of these beams can be used as a pump light beam, and the other beam can be modulated to form the excitation optical signal. Representative examples of such a procedure are provided below and are demonstrated in the Examples section that follows.

The method preferably continues to 102 at which an excitation optical signal is coupled into a first optical fiber to induce Rayleigh backscattering, thereby providing a backscattered signal. The coupling can be by an optical coupler, such as, but not limited to, an optical circulator. Optionally and preferably the method proceeds to 103 at which the backscattered signal into a second optical fiber, spatially separated from the first optical fiber. This can also be achieved by an optical coupler, such as, but not limited to, an optical circulator.

The method optionally and preferably continues to 104 at which the backscattered signal is optically amplified, thereby generating a sensing signal. The sensing signal is indicative of the optical properties of the first cable, because it results from a Rayleigh scattering that occurs within the fiber.

In embodiments in which 103 is employed, the backscattered signal is optically amplified in the second fiber. In embodiments in which 103 is skipped, the backscattered signal is optically amplified in the first fiber. The optically amplification is typically achieved by coupling the pump beam into the respective fiber. Specifically, in embodiments in which 103 is employed, the pump beam is coupled into the second fiber. In embodiments in which 103 is skipped, the pump beam is coupled into the first fiber. The pump beam can be coupled into the respective fiber either to establish propagation of both the backscattered signal and the pump beam in the same direction, or to establish propagation of the backscattered signal and the pump beam in opposite directions.

The present Inventors found that optical amplification, particularly, but not necessarily, optical amplification by means of stimulated Brillouin scattering, can flatten or, more preferably, reverse the characteristic exponential decay of the Rayleigh backscattered signal. The characteristic exponential decay of the Rayleigh backscattered signal can be formulated as $\exp[-2\alpha z]$, where $\alpha$ is a Rayleigh scattering coefficient characteristic to fiber and z is the distance from the point of entry of the excitation signal to the point along the fiber at which the Rayleigh scattering occurs. The characteristic exponential decay of the Rayleigh backscattered signal relates to the power P of the signal via the relation P=$\rho \langle z \rangle$ exp[$-2\alpha z$] where $\rho \langle z \rangle$ is the z-dependent reflectivity of the fiber. In the presence of optical amplification (e.g., Brillouin amplification), the characteristic exponential decay of the sensing signal is exp[$\langle gI-2\alpha \rangle z$], where g the gain coefficient (e.g., the Brillouin gain coefficient) and I is the intensity of the pump beam.

The present inventors found that by a judicious selection of power of the pump beam, the effective coefficient of z in the argument of the characteristic exponential decay of the sensing signal can be made zero, close to zero, or positive. This can be achieved by selecting the intensity I of the pump light beam to satisfy the relation gI≥K+2α, where K is a predetermined variation rate which larger than $-0.01$ m$^{-1}$, more preferably larger than $-0.001$ m$^{-1}$, more preferably larger than $-0.0001$ m$^{-1}$. In some embodiments of the present invention I is selected to satisfy the relation gI≥2α, and in some embodiments I is selected to satisfy the relation gI≥2α. The latter two embodiments correspond to a non-zero and positive argument of the characteristic exponential decay of the sensing signal, respectively.

The method optionally and preferably continues to 105 at which the sensing signal is transmitted into a signal analyzer. The signal analyzer can be of any type known in the art. The signal analyzer can comprise an analog signal processing circuit that processes the sensing signal, and optionally displays the signal, for example, on an oscilloscope. The signal analyzer can comprise an analog-to-digital circuit that converts the sensing signal into a digital signal. The signal analyzer can include a digital data processor that receives the digital signal and processes it digitally. The signal analyzer analyzes the sensing signal so as to identify a change in at least one property along the first fiber. In some embodiments of the present invention signal analyzer analyzes the sensing signal so as to identify a spatially-resolved change in at least one property along the first fiber.

A "spatially-resolved change" means that the signal analyzer analyzes identifies the change in the property as well as the approximate location along the fiber at which the change occurs.

The term "property" refers to any physical observable that imparts a change on the optical properties of the first fiber. Representative examples of such properties including, without limitation, a mechanical property (e.g., strain, pressure, vibration, acoustics, acceleration, rotation), a thermal property (e.g., temperature), and a chemical property (e.g., concentrations of a chemical species).

Signal analyzers capable for receiving a sensing optical signal identifying a change of such properties are known in the art and found, for example, in U.S. Pat. Nos. 7,772,541, 6,545,760 and U.S. Published Application No. 20120111104.

The method ends at 106.

FIGS. 1A and 1B are schematic representations of embodiments of a device 10 for detecting interference with an object, such as physical contact with the object, by detecting a change in the optical properties of a segment of the object according to embodiments of the teachings herein.

Device 10 optionally and preferably comprises includes a signal generator 12, for generating an excitation signal 14. In some embodiment, signal generator 12 is configured to generate a pulsed signal 14. In some embodiments, signal generator 12 is configured to generate a narrow spectral band signal 14.

In some embodiments, signal generator 12 comprises an electromagnetic signal generator configured to generate a coherent electromagnetic signal 14. In some such embodiments signal generator 12 comprises a pulsed laser.

In some embodiments signal 14 comprises an electromagnetic light signal having a wavelength in the range of 0.3 micrometer to 1.6 micrometer. In some embodiments signal 14 comprises a signal in the visible light spectrum (having a wavelength between 0.75 micrometer-0.38 micrometer). Signal 14 is directed to an object 16 to be monitored for changes in optical properties. Object 16 may be any suitable object, and in some embodiments comprises an optical fiber, such as an optical fiber strung along or around the perimeter or is placed on or just beneath the ground of an area to be monitored for intrusion.

Rayleigh scattered radiation 18 originating from signal 14 and scattered by at least part of object 16 is received by an optical amplifier, such as Brillouin amplifier 20, which is configured to amplify at least a portion of the spectrum of the scattered radiation and to output amplified radiation 22. The amplified radiation 22 is detected by a detector 23, which provides, as its output, an electrical signal 24 representing the amplified radiation 22.

In the above example, a Brillouin amplifier 20 was used to implement the teachings herein. Some embodiments of the teachings herein a different optical amplifier may be used in place of Brillouin amplifier 20, for example a Raman amplifier.

In some embodiments, such as the embodiment illustrated in FIG. 1A, Brillouin amplifier 20 and detector 23 are located physically separate from object 16, such that the Rayleigh scattered radiation 18 travels along object 16 from the location in which the signal 14 was scattered until the edge of object 16 and until it reaches Brillouin amplifier 20.

In some embodiments, such as the embodiment illustrated in FIG. 1B, Brillouin amplifier 20 is part of, or is physically associated with, the object, such that Brillouin amplification of at least a portion of the spectrum of Rayleigh scattered radiation 18 by amplifier 20 occurs along object 16.

As is known in the art, in order to perform Brillouin amplification of a signal, the signal has to counter-propagate through the object with a pump, such that as a result of interaction between the signal and the pump, the signal is amplified at the expense of the pump. In order for Brillouin amplification to occur, the signal has to be down-shifted in frequency relative to the pump. The down-shift quantity is dependent on the interaction medium, and for an optical fiber is in the order of 10-11 GHz. The downshifted signal is known as the Stokes beam.

In some embodiments, such as the embodiment illustrated in FIG. 1A, in which the Brillouin amplification takes place after the Rayleigh scattered radiation exits the object 16, which in some embodiments is an optical fiber, a second optical fiber is used as Brillouin amplifier 20 to perform the Brillouin amplification. The Rayleigh scattered radiation 18 enters the second optical fiber, and the Brillouin amplification pump (not shown, but for example, generated by a suitable continuous wave or pulsed laser) enters the second optical fiber from the opposite end. The central optical frequency of the optical spectrum of the Rayleigh scattered radiation 18 is down-shifted relative to the central optical frequency of the optical spectrum of the pump according to an embodiment of the teachings herein, as described hereinbelow. The Brillouin amplification of the down-shifted Rayleigh scattered radiation 18 then takes place within the second optical fiber.

In some embodiments, the difference, or shift, between the central optical frequency of the pump and the central optical frequency of the Rayleigh scattered radiation 18 is selected to be substantially equal to a value which provides maximum optical amplification of the Rayleigh scattered radiation 18. Such a frequency difference is typically referred to as the resonant Brillouin frequency, and may vary from one optical fiber to another. However, common optical fibers have a nominal resonant Brillouin frequency value in the region of 11 GHz. In this situation, the Brillouin amplifier acts as a bandpass filter with gain, where the filter spectrum is centered symmetrically about the optical spectrum of the Rayleigh scattered radiation 18. The bandpass filter defined by the Brillouin amplifier has a filter bandwidth determined by the physics of the Brillouin process in the optical fiber as well as by the spectral bandwidth of the pump, as is known in the art.

In some other embodiments, the difference between the central optical frequency of the pump and the central optical frequency of the Rayleigh scattered radiation 18 is selected to be less than or greater than the value of the resonant Brillouin frequency, such that the difference causes detuning from the resonant value. In such embodiments, the Brillouin amplifier acts as a bandpass filter with gain, where the filter spectrum is shifted from the center of the optical spectrum of the Rayleigh scattered radiation 18. The bandpass filter defined by the Brillouin amplifier has a filter bandwidth determined by the physics of the Brillouin process in the optical fiber, as well as by the spectral bandwidth of the pump, as is known in the art.

In certain embodiments, detuned amplification is advantageous over amplification at the resonant Brillouin frequency, because the upper spectral region (if the detuning value is greater than the resonant value) or lower spectral region (if the detuning value is less than the resonant value) of the Rayleigh scattered radiation 18 is amplified more than the central region of the Rayleigh scattered radiation. Such differentiation leads to preferential amplification of the information-bearing (AC) portion of the Rayleigh scattered radiation relative to amplification of the DC portion of the Rayleigh scattered radiation. It was unexpectedly found by the present Inventors that this also leads to an improved signal to noise ratio (SNR) in the final output signal. Similarly, using the principle described above, it is possible in some embodiments to preferentially amplify both the upper and lower sideband of the Rayleigh scattered radiation 18 as compared to the amplification of central region, if the pump spectrum consists of the proper spectral profile to simultaneously preferentially amplify both sidebands with respect to the central portion of the Rayleigh spectrum.

Based upon the description above, it is understood that the spectral region of the Rayleigh scattered radiation 18 which undergoes preferential amplification is dependent upon the filter bandwidth of the Brillouin gain filter, the shape of the Brillouin gain spectrum, and the magnitude of spectral detuning between the pump and the Rayleigh scattered radiation. The effective value of the filter bandwidth of the Brillouin gain filter is dependent upon the natural Brillouin bandwidth in a particular optical fiber being used, as well as on the bandwidth of the pump.

For example, when using for the Brillouin amplifier an optical fiber having a resonant detuning value of 10.8 GHz, a natural Brillouin bandwidth of 20 MHz, and a pump bandwidth not greater than 20 MHz, if the value of the difference between the central optical frequency of the pump and the central optical frequency of the Rayleigh scattered radiation is equal to the resonant Brillouin frequency, the central portion of the Rayleigh spectrum which undergoes preferential amplification lies in the spectral region of approximately a width of ±10 MHz about the central optical frequency of the Rayleigh scattered radiation.

Using the optical fiber described above, if the pump bandwidth is 100 MHz or 1 GHz, in some embodiments the portion of the Rayleigh spectrum which undergoes preferential amplification increases, and in certain embodiments lies in the spectral region having approximately a width equal to ±50 MHz or ±0.5 GHz respectively about the central optical frequency of the Rayleigh scattered radiation.

As another example, using the optical fiber described above, the value of the difference between the central optical frequency of the pump and the central optical frequency of the Rayleigh scattered radiation is greater than the value of the resonant Brillouin frequency by 30 MHz, so that the actual detuning is equal to 10.8 GHz+0.03 GHz=10.83 GHz, and the pump bandwidth is not greater than the natural Brillouin bandwidth of 20 MHz. In this case the portion of the Rayleigh spectrum which undergoes preferential amplification lies in a spectral region which is spectrally upshifted from the central optical frequency of the Rayleigh scattered radiation by an amount equal to the detuning magnitude of 30 MHz, and which has a spectral width of approximately 20 MHz. Additionally, if in this setting the pump bandwidth is increased, the width of the Rayleigh spectrum which undergoes amplification also increases as explained above.

Based on the description above it is appreciated that in some embodiments the shape and width of the pump spectrum, the value of the pump bandwidth and the magnitude of detuning from the resonant Brillouin frequency are selected so that the ratio of the amplification of the information-bearing (AC) portion of the Rayleigh scattered radiation to that of the amplification of the central frequency (DC) of the Rayleigh scattered radiation will be maximized or optimized so as to enhance the signal which is indicative of intrusion or of a change of temperature along the fiber.

The discussion above relates to Brillouin amplification for implementing an embodiment of the teachings herein. Embodiments of the teachings herein are implemented using other types of optical amplification. For example, in some embodiments, Raman amplification is used for implementing the teachings herein; such embodiments are substantially the same as discussed above, with appropriate changes in the values of the parameters discussed above.

In some embodiments, such as the embodiment illustrated in FIG. 1B, in which the Brillouin amplification takes place along the object 16 together with the Rayleigh scattering, which in some embodiments is an optical fiber, the signal emitted by signal generator 12 is divided into two portions. A first portion, forming signal 14, enters the optical fiber 16 after being down-shifted in frequency and modulated or pulsed. A second portion of the signal emitted by signal generator 12 enters the optical fiber 16 without undergoing down-shifting. As a result, the Rayleigh backscattered from the first portion functions as the Stokes and propagates along the fiber in the opposite direction to the propagation of the second portion of the signal, and thus the second portion functions as the pump for amplifying the first Rayleigh scattered radiation.

It is appreciated that using the amplification method described herein, when the Rayleigh scattered radiation is amplified within optical fiber 16, the Rayleigh scatter which originates from a portion of the fiber far from the entrance of the fiber is amplified more than scatter which originates from a portion of the fiber near the entrance of the fiber, since the amplification is approximately proportional to exp(gIL) where g is the Brillouin gain coefficient, I is the pump intensity, and L is the interaction length. Since Rayleigh scattered radiation which originates far from the fiber entrance interacts with the pump over a longer interaction length L, it is amplified more than Rayleigh scattered radiation which originates closer to the fiber entrance. Therefore, in some embodiments, the signal intensity of the amplified Rayleigh scattering signal does not follow the same exponential decrease with fiber distance as is the case with OTDR and COTDR systems known in the art. Rather, in some embodiments, the amplified Rayleigh scattering signal can decrease at a lesser rate, not decrease at all, or even increase with distance of origin along the fiber. This is advantageous over OTDR and COTDR systems known in the art, in which the intensity of the Rayleigh scatter which originates from portions of the fiber far from the entrance to the fiber is weaker than the intensity of Rayleigh scatter which originates from portions of the fiber near the entrance of the fiber, resulting in the exponentially decreasing signal amplitude characteristic of OTDR and COTDR systems known in the art.

Any suitable method for down-shifting or up-shifting the optical frequency of light may be used in implementing embodiments of the teachings herein. Various suitable methods for down-shifting or up-shifting the optical frequency of light are known in the art, and any of these suitable methods for down-shifting the Rayleigh scattered radiation relative to the pump for performing Brillouin amplification may be used for implementing the teachings herein. In some embodiments, the down-shifting is performed by sinusoidally modulating the light, for example at approx. 11 GHz. This modulation process forms spectral sidebands around the central optical frequency of 11 GHz shifts, one of which can then be filtered out and the other may be left as a band downshifted or upshifted relative to the central frequency. In another known technique, the light is modulated using a single-sideband modulator so that only one sideband forms during the modulation.

Following amplification of at least a portion of the spectrum of the Rayleigh scattered radiation 18 by Brillouin amplifier 20, generation of amplified signal 22, and conversion of amplified signal 22 to electrical signal 24, electrical signal 24 is transmitted to a processor 26. For each segment of object 16, processor 26 compares signals 24, corresponding to Rayleigh scattered radiation 18 received from that segment, at two or more time points, and identifies a change in the Rayleigh scattered radiation 18 received from the segment.

In some embodiments, the change identified by processor 26 comprises a change in the interference between Rayleigh scattered radiation signals 18.

Processor 26 is also configured to use the identified change in the Rayleigh scattered radiation 18 to detect a change in the optical properties of the segment, and to identify the segment in which the change in the optical properties occurred, as is known in the art of OTDR and COTDR systems.

In some embodiments, the segment of the object comprises a segment having a length of one or more meters, for example, at least 1 meter, at least 3 meters, at least 5 meters, at least 10 meters, at least 15 meter, at least 20 meters, at least 50 meters, at least 100 meters or more. In some embodiments, the object has a length of several kilometers, for example, at least 1 kilometer, at least 2 kilometers, at least 5 kilometers, at least 8 kilometers, at least 10 kilometers, or more.

In some embodiments, the segment comprises a segment having a length of at most 2 meters. In some embodiments, the segment has a length of at most 1.5 meters, at most 1 meter, at most 0.5 meters or even less.

In some embodiments, object 16 comprises an optical fiber stretched around the perimeter of an area. In such embodiments, a detected change in the optical properties of a segment of the fiber is indicative of an interference with the fiber at that segment, such as physical contact with the fiber at that segment, which may be indicative of an intrusion into the area. In some embodiments the optical fiber may be embedded within or may be in some other physical contact with an object to be monitored.

FIG. 11A is a schematic illustration of a system 200 for optical sensing, according to some embodiments of the present invention. System 200 can be used for executing method 100 as delineated above, particularly in embodiments in which the optical amplification is executed in the second fiber. System 200 comprises a light source system 202 configured for generating an excitation optical signal 204 selected to induce Rayleigh backscattering, and a pump light beam 206 selected to amplify the Rayleigh backscattering. System 200 optionally and preferably additional comprises an arrangement of optical couplers 208 arranged for coupling excitation optical signal 204 into a first optical fiber 210 thereby providing a backscattered signal 212, and for coupling backscattered signal 212 and pump light beam 206 into a second optical fiber 214, spatially separated from first optical fiber 210, to thereby generate an optically amplified sensing signal 216. In various exemplary embodiments of the invention system 200 comprises a signal analyzer 218 that receives sensing signal 216, and analyzes it so as to identify a change in at least one property along first fiber 210. For clarity of presentation, sensing signal 216 is shown only on the entry to signal analyzer 218 but the ordinarily skilled person would appreciate that sensing signal 216 is formed already in fiber 214 by means of the nonlinear interaction between signal 212 and beam 206.

FIG. 11B is a schematic illustration of a system 300 for optical sensing, according to alternative embodiments of the present invention. System 300 can be used for executing method 100 as delineated above, particularly in embodiments in which the optical amplification is executed in the same fiber in which the Rayleigh backscattering occurs. System 300 is similar to system 200 except that pump beam 206 is also directed into first fiber 210. In the illustration shown in FIG. 11B, signals 204 and 206 are combined by an optical combiner 220 prior to their entry into coupler 208, but this need not necessarily be the case since other optical configurations can be employed to couple excitation optical signal 204 and pump light beam 206 into first fiber 210.

Various embodiments of the present invention as delineated hereinabove are further detailed below.

In some embodiments optical amplification is employed to at least a portion of the spectrum of Rayleigh-scattered radiation. Some embodiments comprise methods and devices for detecting a change in the optical properties of a segment of an object using optical amplification, such as Brillouin amplification or Raman amplification, of at least a portion of the spectrum of Rayleigh-scattered radiation. In some embodiments, the methods and device detect a change in the optical properties of a segment of an object using Raman amplification of Rayleigh-scattered radiation. Some embodiments relate to the field of intrusion detection. Some embodiments comprise methods and devices for intrusion detection using detection of a change in Rayleigh scattering of radiation transmitted through an object to be monitored, where at least a portion of the spectrum of the Rayleigh-scattered radiation is optically amplified before detection using Brillouin amplification, Raman amplification, or any other suitable optical amplification.

In some embodiments of the invention, the method detects a change in the optical properties of a segment of an object, by transmitting an excitation signal through an object to be monitored, amplifying at least a portion of the spectrum of the Rayleigh-scattered radiation scattered by the object using an optical amplifier to obtain amplified radiation, and detecting the amplified radiation using a detector. For each segment within the object, the method compares the amplified radiation at at least two points in time to identify a change in the Rayleigh scattered radiation. The method uses the identified change to detect a change in the optical properties of a segment within the object and thereby to identify a segment of the object in which the change in optical properties occurred.

In some embodiments, the change is at least one member of the group consisting of stress in the segment, strain in the segment, temperature of the segment, and combinations thereof.

In some embodiments, the optical amplifier comprises a Brillouin amplifier. In some embodiments, the optical amplifier comprises a Raman amplifier.

In some embodiments, the source of the Rayleigh-scattered radiation scattered by the object and amplified by the optical amplifier is the excitation signal transmitted through the object.

In some embodiments, the detected change in the optical properties of the segment within the object is indicative of an interference with the object, such as physical contact with the object or unusual vibration of the object, in the identified segment. In some such embodiments, in which the object surrounds the perimeter of an area, such interference may be indicative of an intrusion into the area at the identified segment of the perimeter.

For example, in some embodiments change in the optical properties is detected for purposes other than intrusion detection, for example, monitoring of mechanical and structural integrity (e.g., in mechanical components such as propellers, rotors and wings, and structural elements such as fuselages, beams, pillars and supports) or for example, vibration monitoring (e.g., due to earthquakes, explosions, rotating mechanical elements).

In some embodiments, the detected change in the optical properties of the segment within the object is indicative of a loss of structural integrity, excessive deformation or excessive vibration (e.g., First Tacoma Narrows bridge) of the object or of a monitored object that is in physical contact therewith. In some such embodiments, in which the object or monitored object is a mechanical element (e.g., a rotor, propeller, vane or wing) or structural element (fuselage, beam, pillar, support, spar, girder, cable, truss), such change may be indicative of potential or imminent mechanical failure of the object or of the monitored object.

In some embodiments, the detected change in the optical properties of the segment within the object is indicative of an unusual vibration. In some such embodiments, in which the object is a component of a vibration detector, such change may be indicative of noteworthy seismic or explosive activity.

In some embodiments the detected signal is used to monitor temperature along the segments of the object.

In some embodiment, the excitation signal comprises a pulsed signal.

In some embodiments, the excitation signal comprises a narrow spectral band signal.

In some embodiments the excitation signal comprises an electromagnetic signal. In some embodiments, the excitation signal comprises a coherent signal, such as a signal emitted by a pulsed laser.

In some embodiments, the optical amplifier for obtaining the amplified radiation forms part of, or is physically associated with, the object, such that amplifying at least a portion of the spectrum of the Rayleigh scattered radiation occurs along the object.

In some embodiments, amplifying at least a portion of the spectrum of the Rayleigh scattered radiation is carried out externally to the object, such that the Rayleigh scattered radiation travels along the object back towards an optical amplifier located physically separate from the object.

In some embodiments, the identified change in the Rayleigh scattered radiation comprises a change in the interference between Rayleigh scattered radiation signals.

The segment of the object in which a detected change in the optical properties occurred is identified using any suitable method and/or device. In some embodiments, the segment of the object in which the change in the optical properties occurred is identified using a method and/or device known in the art, in some embodiments OTDR.

In some embodiments of the invention, a device detects a change in the optical properties of a segment of an object. Such a device can comprise, a signal generator configured to generate an excitation signal and to transmit the signal through an object to be monitored, an optical amplifier configured to amplify at least a portion of the spectrum of the excitation signal generated by the signal generator which is Rayleigh-scattered by at least part of the object to obtain amplified radiation, a detector configured to detect the amplified radiation from the optical amplifier, and a processor. The processor is optionally and preferably configured to compare, for each segment within the object, the amplified radiation at at least two different points in time to identify a change in the Rayleigh scattered radiation; and to use the identified change to detect a change in the optical properties of a segment within the object and thereby to identify a segment of the object in which the change in the optical properties occurred.

In some embodiments, the change is at least one member of the group consisting of stress in the segment, strain in the segment, temperature of the segment, and combinations thereof.

In some embodiments the optical amplifier comprises a Brillouin amplifier. In some embodiments, the optical amplifier comprises a Raman amplifier.

In some embodiments, the device is configured so that the detected change in the optical properties of the segment within the object is indicative of an interference with the object, such as physical contact with the object or unusual vibration of the object, in the identified segment. In some such embodiments, in which the object surrounds the perimeter of an area, such interference may be indicative of an intrusion into the area at the identified region of the perimeter.

In some embodiments, the device is configured so that the detected change in the optical properties of the segment within the object is indicative of a loss of structural integrity, excessive deformation or excessive vibration of the object or of a monitored object that is in physical contact therewith.

In some embodiments, the device is configured so that the detected change in the optical properties of the segment within the object is indicative of an unusual vibration.

In some embodiments, the signal generator is configured to generate a pulsed signal as the excitation signal.

In some embodiments, the signal generator is configured to generate a spectral narrow band signal as the excitation signal.

In some embodiments, the signal generator comprises an electromagnetic signal generator configured to generate a coherent electromagnetic signal as the excitation signal. In some such embodiments the signal generator comprises a pulsed laser.

In some embodiments the excitation signal comprises a signal in the visible light spectrum (for example, having a wavelength of from about 0.38 micrometer to about 0.75 micrometer). In some embodiments the excitation signal comprises a signal having a wavelength in the range of from about 0.3 micrometer to 1.6 micrometer.

In some embodiments the object comprises an optical fiber.

In some embodiments, the optical amplifier forms part of, or is physically associated with, the object, such that at least a portion of the spectrum of the Rayleigh scatter of the excitation signal is amplified along the object.

In some embodiments, the optical amplifier is located physically separate from the object.

The amplified radiation is optionally and preferably compared for each segment of the object. The segment of the object may be of any suitable length. In some embodiments, the segment of the object comprises a segment having a length of one or more meters, for example, at least 1 meter, at least 3 meters, at least 5 meters, at least 10 meters, at least 15 meter, at least 20 meters, at least 50 meters, at least 100 meters or more. In some embodiments, the segment of the object comprises a segment having a length of several kilometers, for example, at least 1 kilometer, at least 2 kilometers, at least 5 kilometers, at least 8 kilometers, at least 10 kilometers, or more.

In some embodiments, the segment comprises a segment having a length of at most 2 meters. In some embodiments, the segment has a length of at most 1.5 meters, at most 1 meter, at most 0.5 meters or even less.

In some embodiments, the processor is configured to identify a change in the interference between Rayleigh scattered radiation signals coming from the same segment at two different times.

In some embodiments, the processor is configured to identify the segment of the object in which the change in the optical properties occurred by using the OTDR methods.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion. The present example describes a technique referred to as Brillouin Amplification and signal processing of Rayleigh Scattering (BARS). As demonstrated below BARS is suitable for processing the information in a Rayleigh scattered signal. In the present example, two configurations for BARS are described internal BARS (iBARS), where Brillouin Amplification (BA) and Rayleigh scattering overlap in the same fiber and occur simultaneously, and external BARS (eBARS), where BA of the Rayleigh signal takes place in a different fiber.

Figure 3:
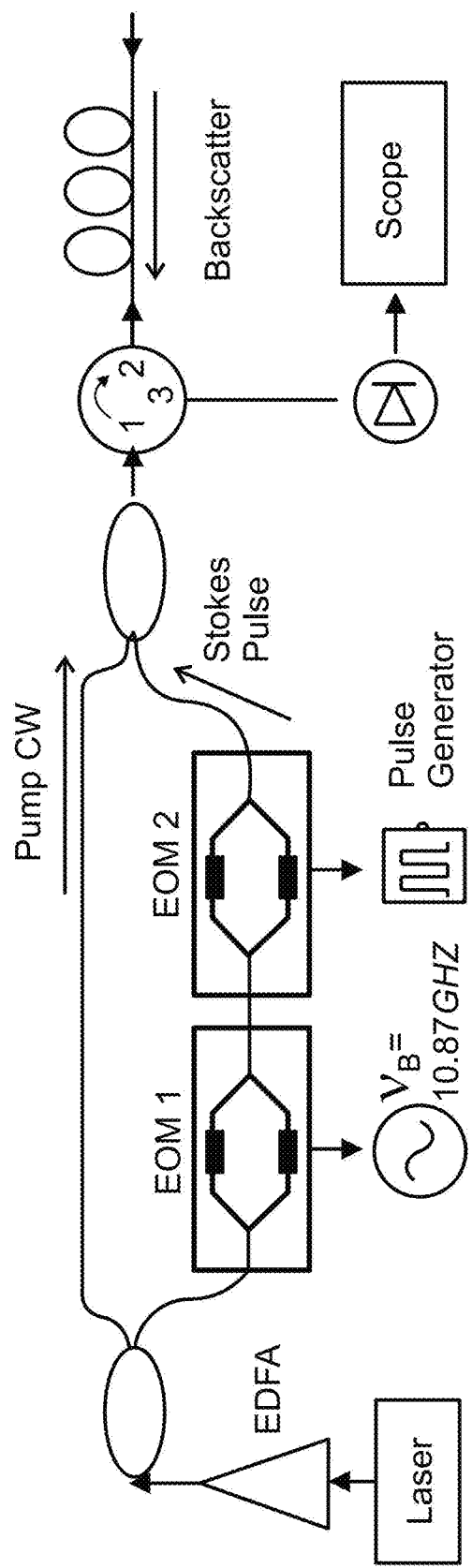
FIG. 3 is a schematic illustration of an experimental system in which Rayleigh scattering and optical amplification are induced in the same optical fiber.

An exemplified configuration of iBARS, according to some embodiments of the present invention is illustrated in FIG. 3. A CW laser is split into a first beam and a second beam. The first beam enters an optical fiber to act as a pump for BA within the fiber. The second beam is first downshifted and is then modulated to form a pulse train, before entering the same side of the fiber.

The following exemplified parameters can be employed for this configuration, but it is to be understood that other parameters can also be selected and are therefore also contemplated in various exemplary embodiments of the invention. The wavelength of the CW laser can be about 1550 nm, the spectral width of the CW laser can be about 300 kHz. The optical fiber can be an SMF-28® fiber or other type of fiber used in telecommunications, for example. The length of the optical fiber can be about 6 km. The downshifting of the first beam can be to a frequency which is about the Stokes frequency, and it can be achieved by carrier-suppressed modulation at a frequency of, for example, 10.85 GHz. The modulation can be achieved by a Mach-Zehnder modulator. The width of the pulses in the pulse train can be about 20 ns and the duty cycle of the pulse train can be 0.1%.

In FIG. 3, EDFA denotes an Erbium Doped Fiber Amplifier that amplifies the laser light from the laser source. EOM1 denotes a first electro-optic modulator that modulates the second beam to form the Stokes sideband, and EOM2 denotes a second electro-optic modulator that modulates the output of EOM1 to form Stokes pulse before recombining with the CW pump at the entrance to the fiber.

Figure 4:
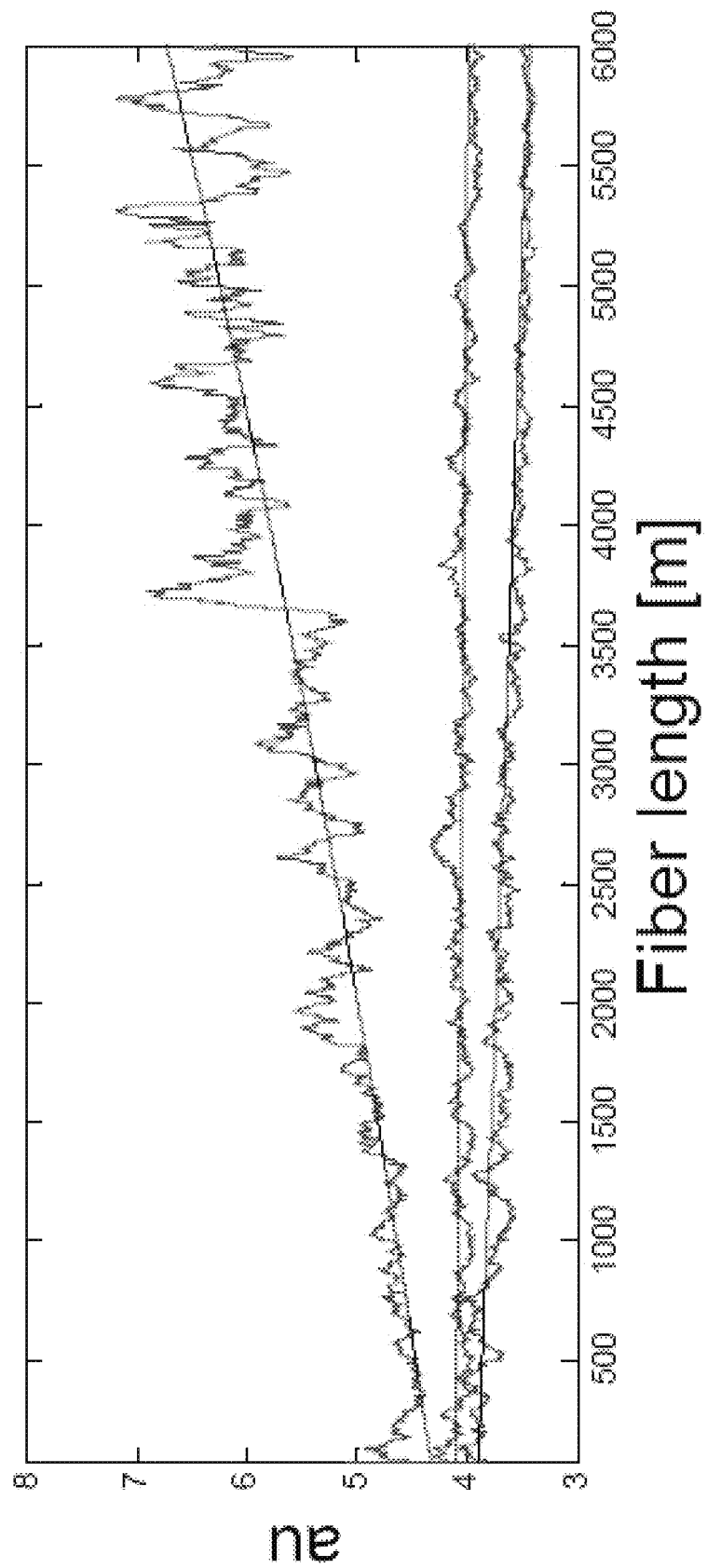
FIG. 4 shows back-scattered light, as obtained in experiments performed according to some embodiments of the present invention using the system shown in FIG. 3.

The Stokes beam undergoes Rayleigh backscattering along the fiber, which is amplified through BA with the counter-propagating pump. It is recognized that the pump beam itself also undergoes Rayleigh and Brillouin scattering, thereby generating background noise. FIG. 4 shows the back-scattered light, once detected. Shown are theoretical (black line) and experimental (red line) light intensities in arbitrary units.

The lower graph corresponds to a configuration without BA, the middle graph corresponds to a configuration with BA at a pump power of 80 mW, and upper graph corresponds to a configuration with BA at a pump power of 140 mW. The vertical displacements of the three graphs shown in FIG. 4 are real and not artificially displaced.

As shown, the iBARS of the present embodiments flattens out and even reverse the characteristic exponential decay of the OTDR signal, depending upon the pump power. This is due to the fact that the Brillouin gain can offset the Rayleigh decay. On one hand, Rayleigh backscattered light which originates from locations further downstream within the fiber undergoes stronger attenuation. On the other hand, this light also undergoes stronger Brillouin amplification. For light entering and exiting the fiber at z=0 due to backscattered Rayleigh originating at point z along the fiber, its power at the output is attenuated by a factor $\rho\langle z\rangle \exp[-2\alpha z]$, relative to the input power, where $\alpha$ is the fiber's Rayleigh scattering coefficient per unit length and $\rho\langle z\rangle$ is the z-dependent reflectivity. In the presence of BA, the backscattered power is therefore $\rho\langle z\rangle \exp[\langle gI-2\alpha\rangle z]$, where g the Brillouin gain coefficient and I is the pump intensity. In the present example, I is approximated to be constant. This approximation is justified because absorption and scattering of the pump is negligible.

For typical values of $\alpha=4.56\times10^{-5}$ [1/m], $g=10^{-13}$[m/W] and effective fiber mode radius of 5 μm in SMF-28, the theory predicts that $gI=2\alpha$ at a pump power of about 72 mW, and $gI-2\alpha=0.087\times10^{-3}$[1/m] at a pump power of about 140 mW, in good agreement with the experimental results shown in FIG. 4.

Figure 5:
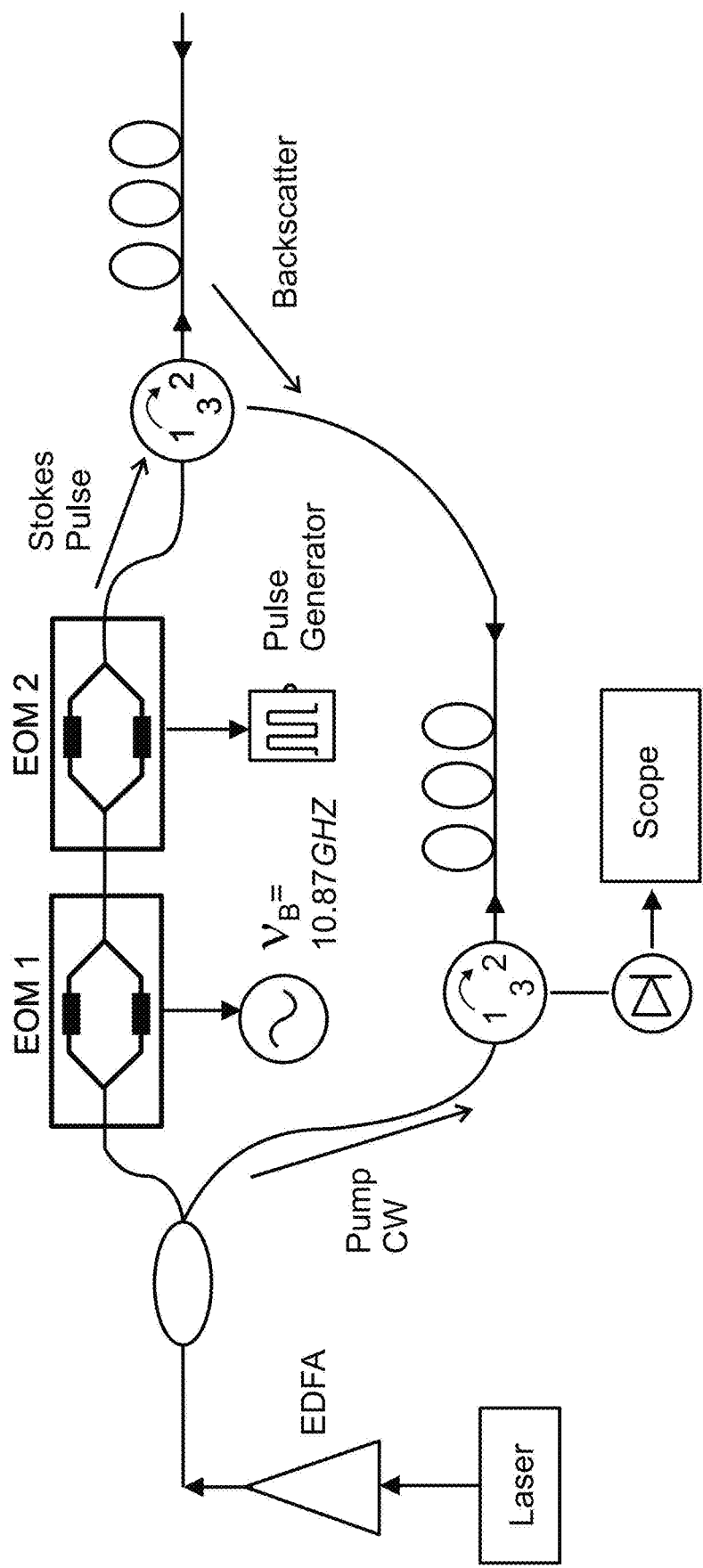
FIG. 5 is a schematic illustration of an experimental system in which Rayleigh scattering and optical amplification are induced in separated optical fibers.

An exemplified configuration of eBARS, according to some embodiments of the present invention is illustrated in FIG. 5. Pulsed light, preferably at the Stokes wavelength enters a first fiber, and the back-scattered Rayleigh signal is then Brillouin-amplified in a second fiber. In the present example, both fibers are SMF-28 with equal lengths of 6 km, and the frequency shift between the pump and Stokes was set at the resonant Brillouin offset of the second fiber equal to 10.85 GHz. Other parameters and types of fibers are also contemplated in various exemplary embodiments of the invention. In FIGS. 3 and 5, similar notations describe similar components.

Figure 6:
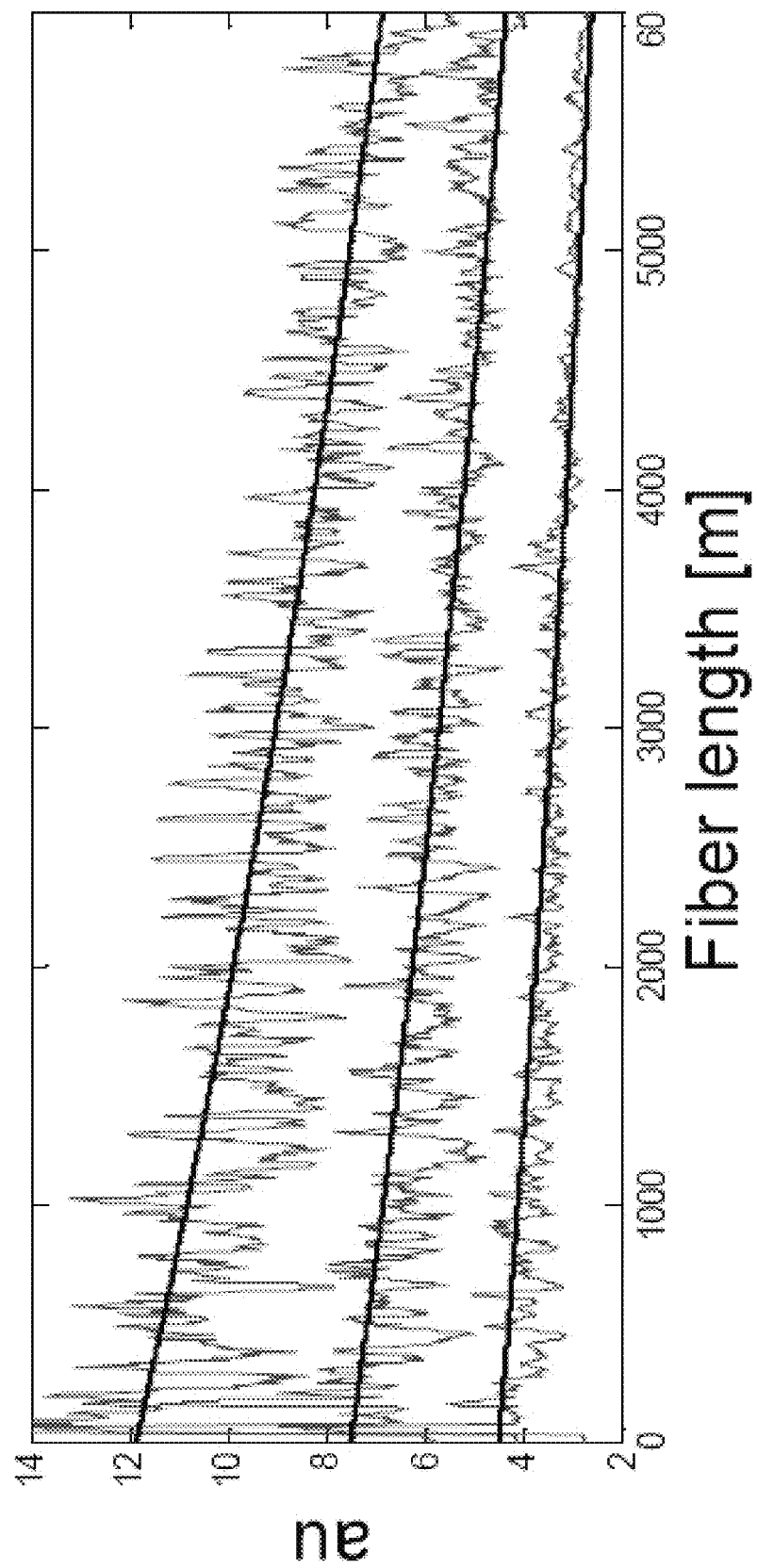
FIG. 6 shows signal, once amplified, as obtained in experiments performed according to some embodiments of the present invention using the system shown in FIG. 5.

FIG. 6 shows the signal sampled from the second fiber. Shown are theoretical (black line) and experimental (red line) light intensities in arbitrary units. The lower graph corresponds to a configuration without BA, the middle graph corresponds to a configuration with BA at a pump power of 80 mW, and upper graph corresponds to a configuration with BA at a pump power of 140 mW. The vertical displacements of the three graphs shown in FIG. 6 are real and not artificially displaced.

Unlike iBARS, the entire Rayleigh signal in the eBARS configuration is amplified by approximately the same amount. The results of the experiments by the present Inventors show an unexpected effect wherein the noise floor of the signal increases with the pump power. The term "noise floor" means that the entire signal floats on a DC value. Thus, the present inventors found that for higher pump power the entire signal floats on a higher DC value.

The present Inventors found that one of the main sources of this noise is the BA of the portion of the Stokes light which does not contribute to the pulse. It was realized by the present Inventors which that the BA of the portion of the Stokes light which does not contribute to the pulse may be non-negligible, particularly when the pulse duty cycle is small. This is typically the case in OTDR systems. High noise floor reduces the SNR and can saturate the detector.

In a search for a solution to the discovered problem of noise floor, the present Inventors found that a judicious selection of the BA configuration can considerably improve the SNR and reduce the possibility of saturation.

Figure 7:
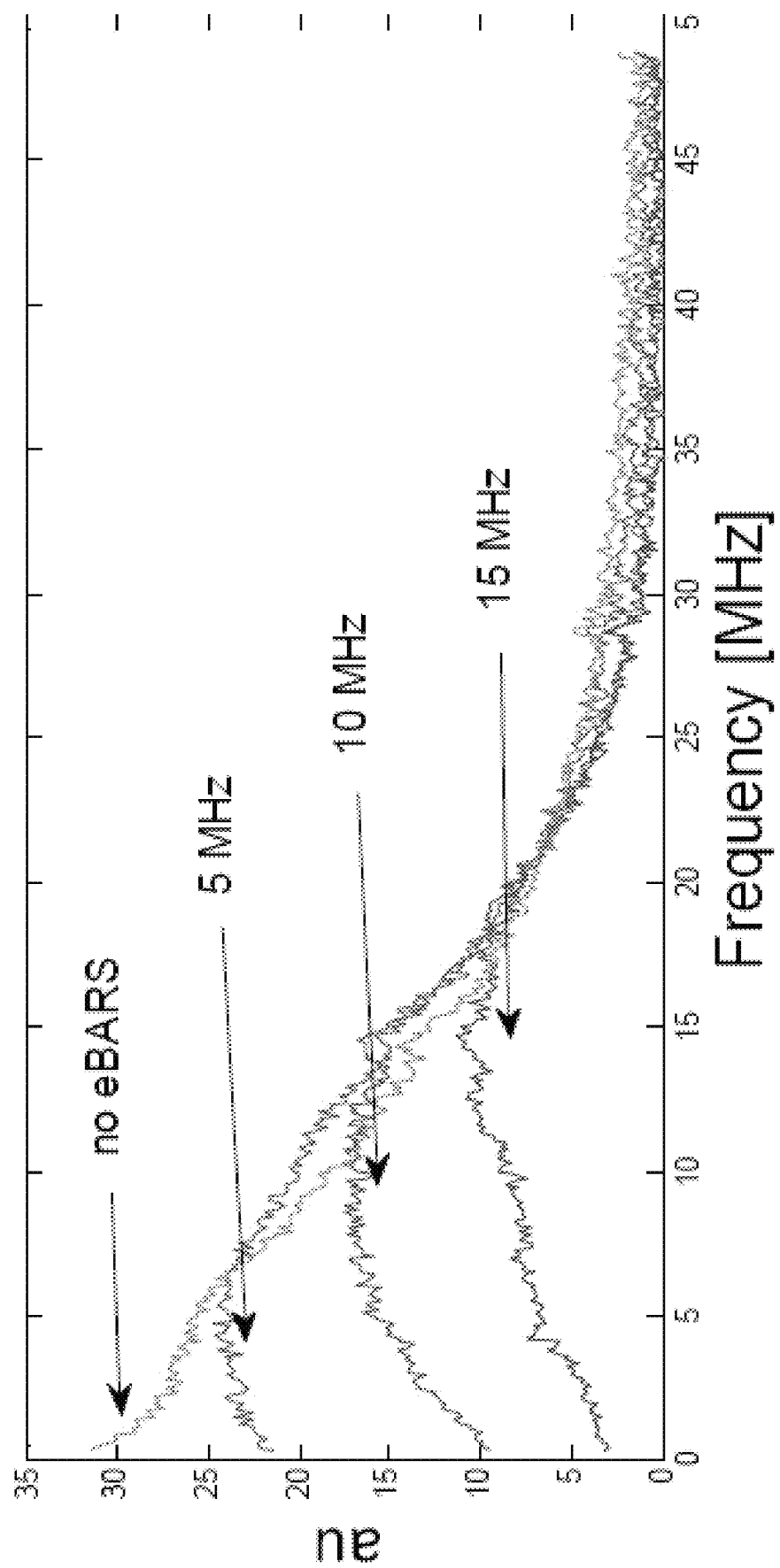
FIG. 7 shows the RF spectrum of the Rayleigh signal, as obtained in experiments performed according to some embodiments of the present invention.
Figure 8A:
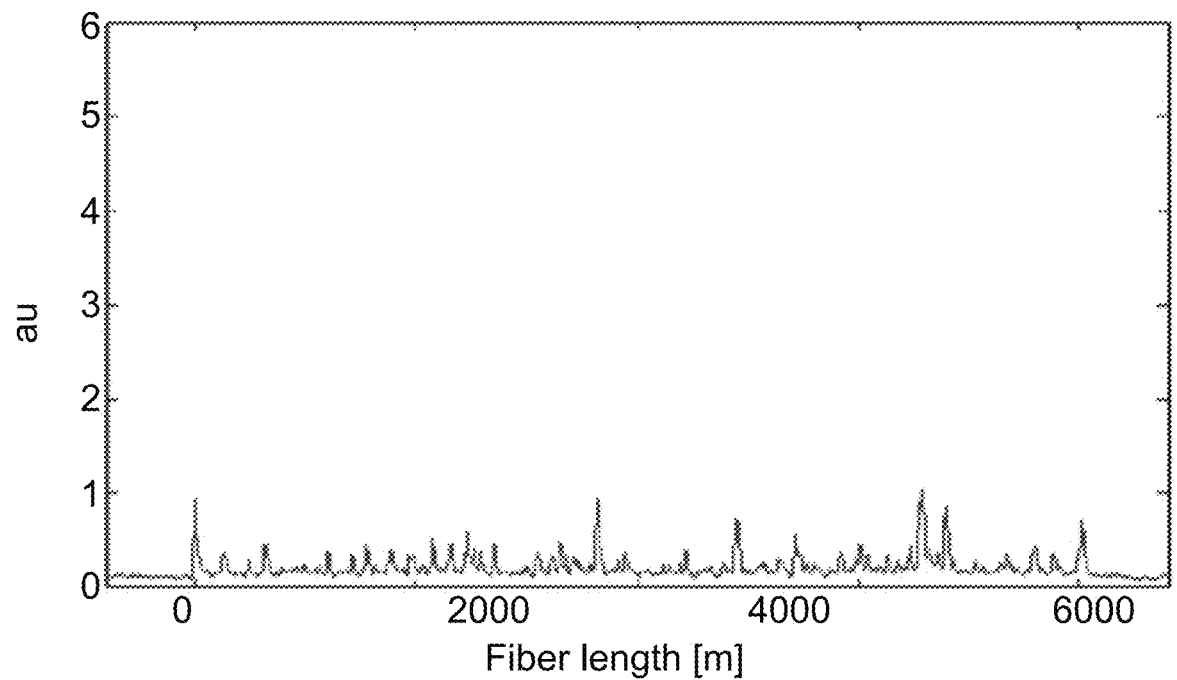
FIGS. 8A-8C show Rayleigh signal, as obtained in experiments in which single sideband amplification was employed according to some embodiments of the present invention.
Figure 8B:
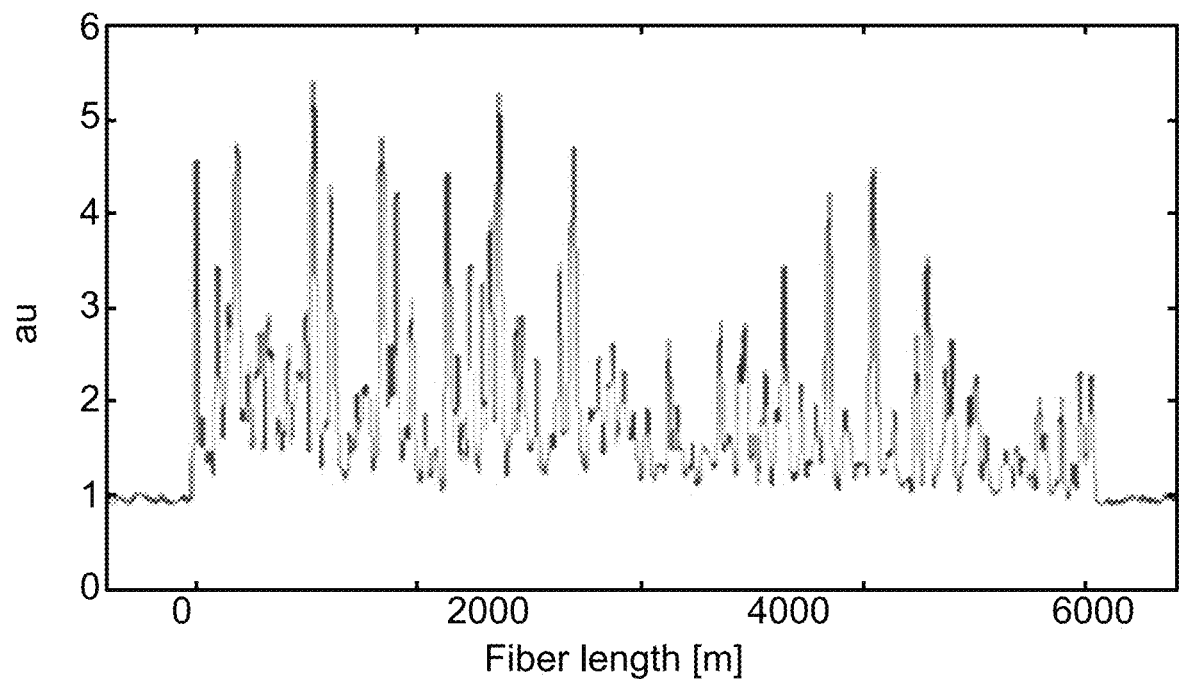
Figure 8C:
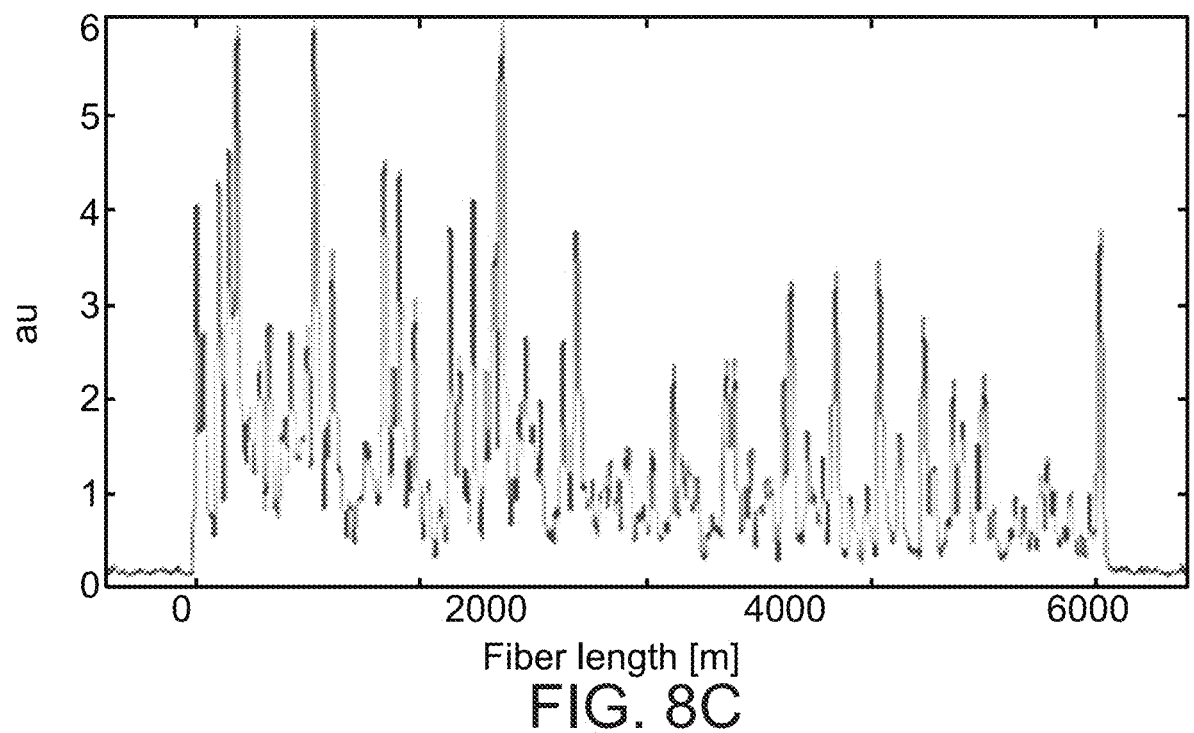

According to some embodiments of the present invention the AC component of the Rayleigh signal is enhanced relative to the DC component, by performing single-sideband (SSB) amplification of the Rayleigh signal. FIG. 7 shows the RF spectrum of the Rayleigh signal without Brillouin processing, and after SSB-eBARS for three values of detuning from the Brillouin resonant condition between the pump and Stokes: 5 MHz, 10 MHz and 15 MHz. FIGS. 8A-8C display the resulting Rayleigh signal for three cases: output of the first fiber without eBARS (FIG. 8A); eBARS with resonant BA (FIG. 8B); and off-resonant SSB-eBARS at a detuning of 10 MHz (FIG. 8C). FIGS. 8A-8C demonstrate the advantage of the technique of the present embodiments. The technique successfully amplifies the Rayleigh scattering while reducing or eliminating the addition of an amplified DC signal.

In experiments performed by the present Inventors, a controlled vibrating strain was applied to a 5 km fiber using a loudspeaker.

Figure 9A:
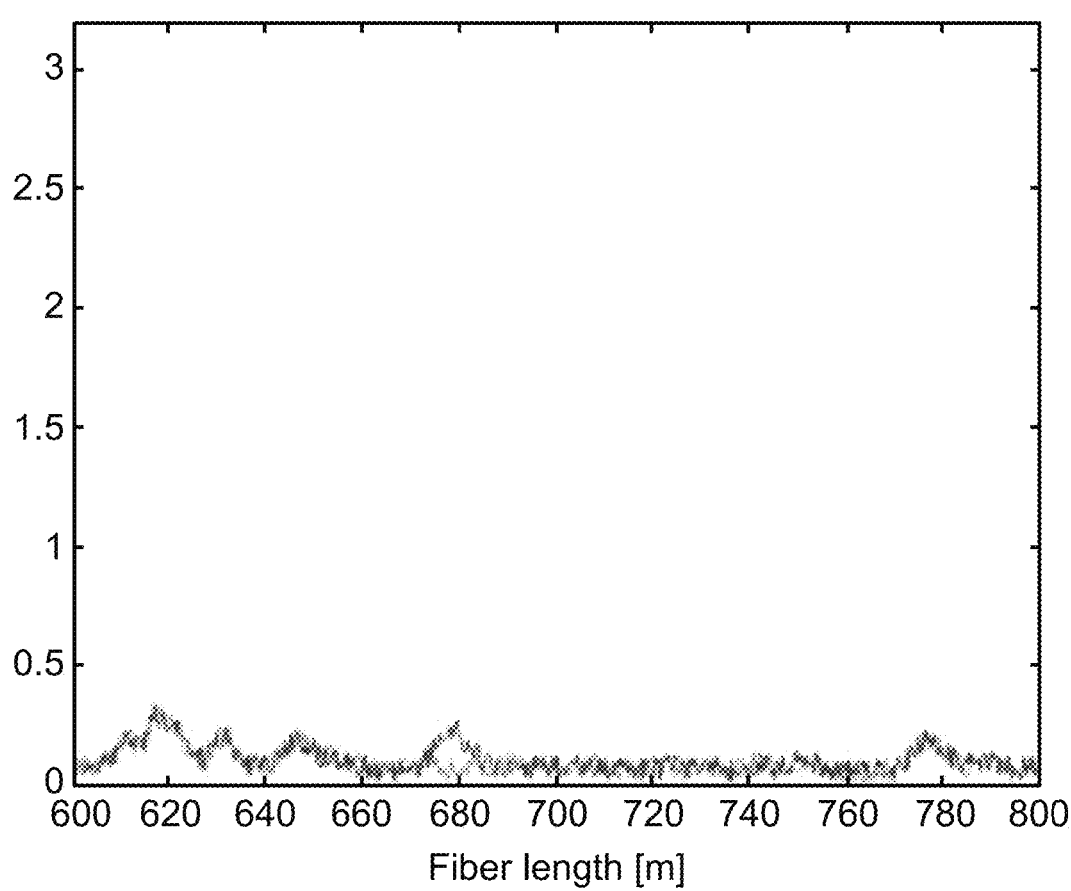
FIGS. 9A-9D show results of experiments performed according to some embodiments of the present invention wherein vibration was applied at one location along an optical fiber.
Figure 9B:
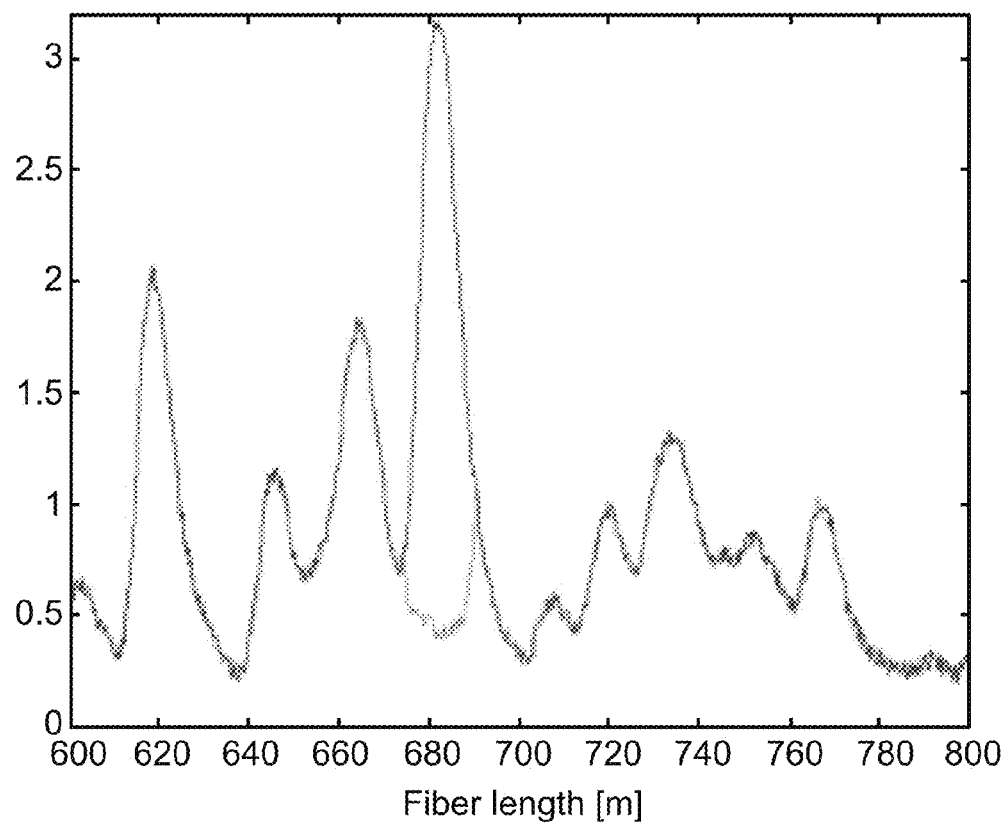
Figure 9C:
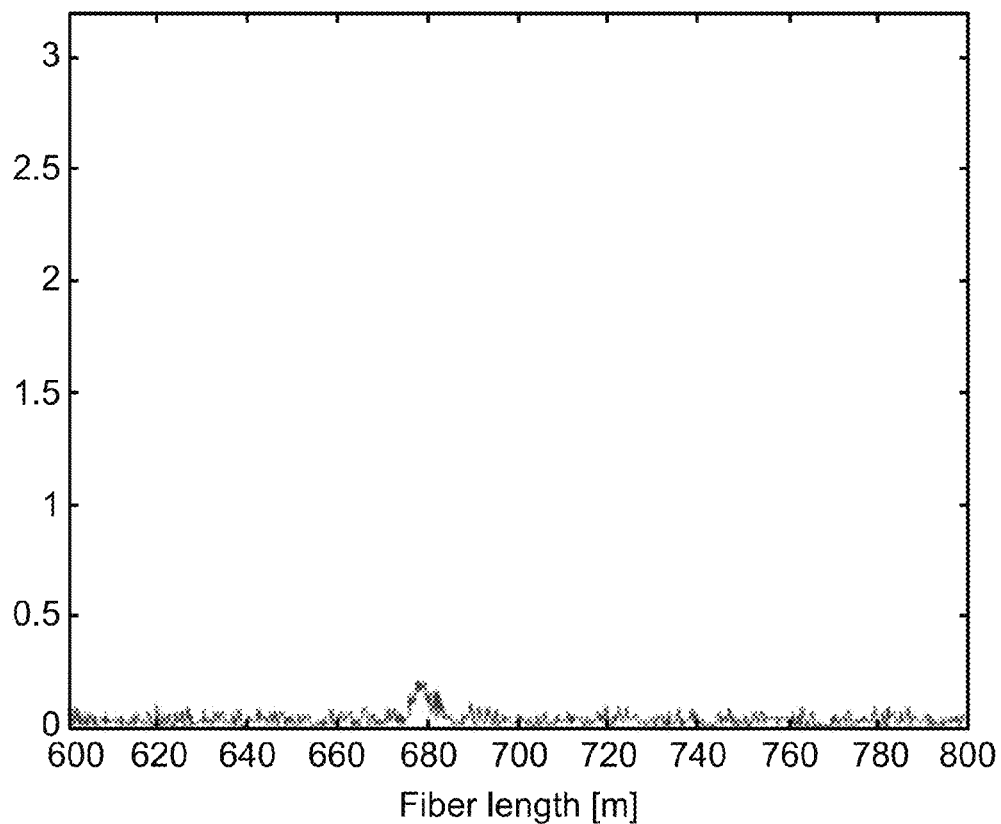
Figure 9D:
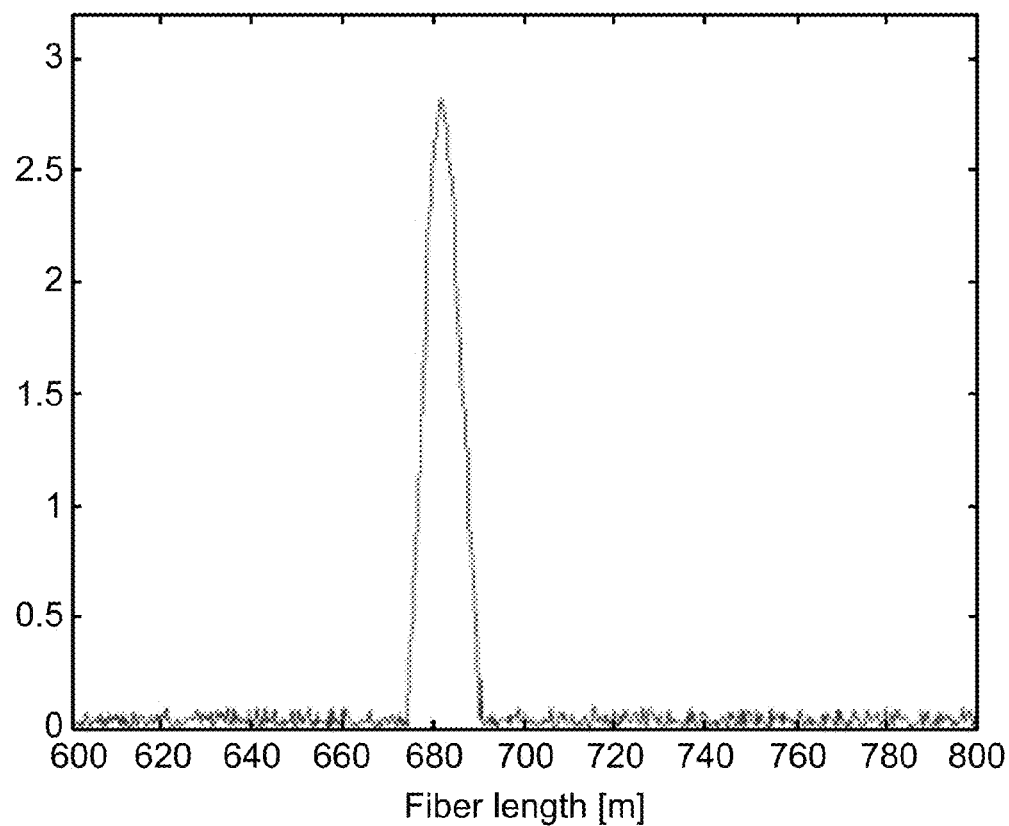

In one set of experiments, the location of the vibration was at about 680 m. The results of these experiments are shown in FIGS. 9A-9D. FIG. 9A depicts the signal without (lower red curve) and with (upper blue curve) the vibration, both without the use of SSB-eBARS. FIG. 9B repeats this with SSB-eBARS turned on. FIGS. 9C and 9D show the vibration signals after further signal processing which reduces the static background signal, where FIG. 9C corresponds to an experiment in which no eBARS was employed and FIG. 9D corresponds to an experiment in which eBARS supplemented with SSB was employed. FIGS. 9A-9D demonstrates the benefit of the technique of the present embodiments in strain sensing: enhanced SNR of the vibration signal. The SNR was improved by a factor of about 10 at a detuning of 10 MHz.

In another set of experiments, two vibration signals were applied at two different frequencies and locations along the fiber: an 84 Hz vibration at 109 m, and a 90 Hz vibration at 117 m. The results of these experiments are shown in FIG. 10, demonstrating signals with high SNR and resolution.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

REFERENCES

[1] G. P. Agrawal, "Nonlinear Fiber Optics", 5th Ed. (Academic Press, 2013)
[2] C. A. Galindez-Jamioy and J. M. López-Higuera, J. Sensors, 2012, 1, (2012)
[3] Koyamada, Y., Imahama, M., Kubota, K. and Hogari, K., J. Lightwave Tech. 27, 1142 (2009)
[4] C. Pan, H. Ye, M. Li, S. Zhao, and X. Sun, in Optical Fiber Communication Conference, OSA Technical Digest (online) (Optical Society of America, 2014), paper Th2A.21.
[5] A. Champavere, in Optical Fiber Communication Conference, OSA Technical Digest (online) (Optical Society of America, 2014), paper W3D. 1.
[6] Jean-Charles Beugnot, Moshe Tur, Stella Foaleng Mafang, and Luc Thévenaz, Optics Express, 19, 7381 (2011)
[7] Lijuan Zhao, Yongqian Li, Zhiniu Xu, Zhi Yang and Anqiang Lü, Sensors and Actuators A: Physical, 216, 28 (2014)
[8] Minardo A., Coscetta A., Zeni L. and Bernini R., IEEE Photonics Technology Letters, 26, 1251 (2014)
[9] Xuping Zhang, Junhui Hu, and Yixin Zhang, J. Lightwave Tech., 31, 1954 (2013)
[10] Qingsong Cui, Pamukcu S., Aoxiang Lin, Wen Xiao, Herr D., Toulouse J. and Pervizpour M., Sensors Journal, IEEE, 11, 399 (2011)
[11] Andrei A. Fotiadi and Roman V. Kiyan, Opt. Lett. 23, 1805 (1998)
[12] Loayssa Alayn, Benito David and José Garde Maria, Optical Fiber Technology, 8, 24 (2002)
[13] Pant R, Marpaung D, Kabakova I V, Morrison B, Poulton C G and Eggleton B J, Lasers and photonic reviews, 8, 653 (2014)
[14] Shalom Bloch, Alexander Lifshitz, Er'el Granot and Shmuel Sternklar, JOSA B 39, 974 (2013)
[15] Yongkang Dong, 1, Taofei Jiang, Lei Teng, Hongying Zhang, Liang Chen, Xiaoyi Bao, and Zhiwei Lu, Opt. Lett 39, 2967 (2014)

What is claimed is:

1. A method of optical sensing, comprising:
coupling an excitation optical signal into a first optical fiber to induce Rayleigh backscattering, thereby providing a backscattered signal;
coupling said backscattered signal into a second optical fiber, spatially separated from said first optical fiber by at least one optical coupler; and
optically amplifying said backscattered signal in said second optical fiber, thereby generating a sensing signal;
wherein said optically amplifying comprises employing at least one of Brillouin amplification and Raman amplification by coupling a CW pump light beam into said second optical fiber.

2. The method according to claim 1, further comprising transmitting said sensing signal into a signal analyzer, for analyzing said sensing signal so as to identify a change in at least one property along said first fiber.

3. The method according to claim 2, wherein said at least one property is selected from the group consisting of a mechanical property, a thermal property and a chemical property.

4. The method according to claim 1, further comprising transmitting said sensing signal into a signal analyzer, for analyzing said sensing signal so as to identify a spatially-resolved change in at least one property along said first fiber.

5. The method according to claim 1, wherein said excitation optical signal is a pulsed optical signal.

6. The method according to claim 5, wherein a characteristic duty cycle of said pulsed optical signal is less than 10%.

7. The method according to claim 1, wherein said optical amplification is an on-resonance optical amplification.

8. The method according to claim 1, wherein said optical amplification is an off-resonance optical amplification.

9. The method according to claim 8, wherein a detuning frequency of said off-resonance optical amplification is from about 0.1X to about 0.9X, where X is a characteristic on-resonance bandwidth of said optical amplification.

10. A system for optical sensing, comprising:
a light source system configured for generating an excitation optical signal selected to induce Rayleigh backscattering, and a CW pump light beam selected to amplify said Rayleigh backscattering by at least one of Brillouin amplification and Raman amplification;
an arrangement of optical couplers arranged for coupling said excitation optical signal into a first optical fiber thereby providing a backscattered signal, and for coupling said backscattered signal and said pump light beam into a second optical fiber, spatially separated from said first optical fiber by at least one of said optical couplers, to thereby generate an optically amplified sensing signal; and
a signal analyzer, for analyzing said sensing signal so as to identify a change in at least one property along said first fiber.

11. The system according to claim 10, wherein said signal analyzer is configured for analyzing said sensing signal so as to allow identifying a spatially-resolved change in at least one property along said first fiber.

12. The system according to claim 10, wherein said at least one property is selected from the group consisting of a mechanical property, a thermal property and a chemical property.

13. The system according to claim 10, wherein said excitation optical signal is a pulsed optical signal.

14. The system according to claim 13, wherein a characteristic duty cycle of said pulsed optical signal is less than 10%.

15. The system according to claim 10, wherein said pump light beam is selected to induce an on-resonance optical amplification.

16. The system according to claim 10, wherein said pump light beam is selected to induce an off-resonance optical amplification.

17. A method of optical sensing, comprising:

coupling an excitation optical signal into an optical fiber to induce Rayleigh backscattering, thereby providing a backscattered signal;

optically amplifying said backscattered signal in said optical fiber, thereby generating a sensing signal; and transmitting said sensing signal into a signal analyzer, for analyzing said sensing signal so as to identify a change in at least one property along said first fiber;

wherein said optically amplifying is by pump light beam at intensity I that is satisfying $gI \geq K+2\alpha$, said $\alpha$ being a Rayleigh scattering coefficient characteristic to said fiber, said g being a gain coefficient characteristic to said fiber, and said K being a predetermined variation rate which larger than $-0.01$ m$^{-1}$.

* * * * *